US012647193B2

(12) United States Patent
Ravishankar et al.

(10) Patent No.: US 12,647,193 B2
(45) Date of Patent: Jun. 2, 2026

(54) INTERFERENCE MITIGATION ACROSS MULTIPLE CONSTELLATIONS IN A SATELLITE COMMUNICATION SYSTEM

(71) Applicant: HUGHES NETWORK SYSTEMS LLC, Germantown, MD (US)

(72) Inventors: Channasandra Ravishankar, Clarksburg, MD (US); Xiaoling Huang, Germantown, MD (US); John E. Corrigan, III, Germantown, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 678 days.

(21) Appl. No.: 17/887,553

(22) Filed: Aug. 15, 2022

(65) Prior Publication Data

US 2023/0075345 A1     Mar. 9, 2023

Related U.S. Application Data

(60) Provisional application No. 63/233,738, filed on Aug. 16, 2021.

(51) Int. Cl.
H04B 7/185 (2006.01)
H04B 7/06 (2006.01)
H04B 17/345 (2015.01)
H04L 9/40 (2022.01)

(52) U.S. Cl.
CPC ......... H04B 17/345 (2015.01); H04B 7/0617 (2013.01); H04B 7/18521 (2013.01); H04B 7/18584 (2013.01)

(58) Field of Classification Search
CPC ............... H04B 17/345; H04B 7/0617; H04B 7/18521; H04B 7/18584
See application file for complete search history.

(56) References Cited

U.S. PATENT DOCUMENTS

| 9,763,167 | B2 | 9/2017 | Gopal et al. |
| 2002/0044553 | A1 | 4/2002 | Chakravorty |
| 2012/0263042 | A1 | 10/2012 | Natarajan et al. |
| 2016/0359641 | A1 | 12/2016 | Bhat et al. |
| 2018/0084476 | A1 | 3/2018 | Kay |
| 2019/0081697 | A1* | 3/2019 | Wyler .................. H04B 7/2041 |
| 2019/0082481 | A1 | 3/2019 | Ravishankar |
| 2020/0259250 | A1* | 8/2020 | Diamond .................. H01Q 3/08 |

(Continued)

OTHER PUBLICATIONS

Castanet et al., Interference and Fade Mitigation Techniques for Ka and Q/V band Satellite Communication Systems, Jan. 2003 (Year: 2003).*

(Continued)

*Primary Examiner* — Faruk Hamza
*Assistant Examiner* — Aixa A Guadalupe Cruz
(74) *Attorney, Agent, or Firm* — NovoTechIP International PLLC

(57) ABSTRACT

A satellite communication system which provides interference mitigation across multiple constellations. The satellite communication system provides interference mitigation when an in-line event occurs where a main lobe of a satellite of the first constellation and a main lobe of a user terminal communicating with the satellite of the second satellite constellation intersect sufficiently to cause significant interference on a common frequency band of the satellite and the user terminal.

13 Claims, 32 Drawing Sheets

(56)                References Cited

U.S. PATENT DOCUMENTS

| | | | |
|---|---|---|---|
| 2021/0067238 A1* | 3/2021 | Tronc | H04B 7/19 |
| 2021/0092640 A1 | 3/2021 | Ravishankar et al. | |
| 2023/0019858 A1 | 1/2023 | Scott | |

OTHER PUBLICATIONS

ITU, Rec. ITU-R S. 1595, Mar. 21, 2019 (Year: 2019).*
Hajipour et al., Interference Mitigation For A Heterogeneous Satellite Network Based On Spatial Angle And Transmission Power, Nov. 2, 2018 (Year: 2018).*
Sharma et al., In-Line Interference Mitigation Techniques For Spectral Coexistence Of GEO and NGEO Satellites, Aug. 7, 2014 (Year: 2014).*
Sharma et al., "In-line interference mitigation techniques for spectral coexistence of GEO and NGEO satellites", Aug. 2014 (Year: 2014).*
Hajipur et al., "Interference mitigation for a heterogeneous satellite network based on spatial angle and transmission power", Nov. 2018 (Year: 2018).*
Final office action issued Jul. 20, 2023 in related U.S. Appl. No. 17/565,574.
Non-Final office action issued Oct. 26, 2023 in related U.S. Appl. No. 17/565,574.
Notice of Allowance issued Oct. 18, 2023 in related U.S. Appl. No. 17/535,823.
International Search Report and Written Opinion issued Nov. 23, 2022 in corresponding PCT/US2022/040098.
International Search Report and Written Opinion issued Nov. 24, 2022 in corresponding PCT/US2022/040103.
Li et al.,, "Load-Balanced Cooperative Transmission in MEO-LEO Satellite Network", 2018 IEEE 32nd International Conference on Advanced Information Networking and Applications (AINA), IEEE, May 16, 2018 (May 16, 2018), pp. 564-571.
International Search Report and Written Opinion issued Mar. 27, 2023 in related PCT/US2022/40391.
Ravishankar et al., "Next-generation global satellite system with mega-constellations", International Journal of Satellit Communications and Networking, vol. 39, No. 1, Jul. 24, 2020 (Jul. 24, 2020), pp. 6-28.
Non-final office action issued Mar. 29, 2023 in related U.S. Appl. No. 17/535,823.
Non-final office action issued Apr. 5, 2023 in related U.S. Appl. No. 17/565,574.

* cited by examiner

LEO Constellation Parameters (864 satellites)

LEO Constellation Parameters (432 satellites)

118

312 Satellite Elevation (1150 km)

42.3

42.3

37.4

37.4

314 Satellite Coverage Footprint (2292 km)

LEO Gateway Link Antenna Pattern Using
Bessel Function (ES Elev 25 degrees): LEO

MEO Constellation Parameters

612 Satellite Elevation (8000 km)

114

19.5

19.5

41.2

41.2

614 Satellite Coverage Footprint (6523 km)

1800

| Routing Table – Flow Independent | |
|---|---|
| Satellite ID | Next Hop |
| 1 | East |
| 2 | MEO-1 |
| 3 | Self |
| ⋮ | |
| K | South |
| K+1 | MEO-2 |
| ⋮ | |
| N | South |

1810

| Routing Table – Flow Dependent | | |
|---|---|---|
| Satellite ID | Next Hop | Flow Type |
| 1 | East | Delay Sensitive, Guaranteed Throughput |
| 1 | MEO-1 | Delay Insensitive |
| 1 | Self | Delay Tolerant (Sensitive, Best Effort) |
| 2 | MEO-1 | All Traffic |
| ⋮ | | |
| K | South | |
| K+1 | MEO-2 | |
| | | |
| N | South | |

2200

2214 MEO Satellite

2210B LEO Satellite2

2210A LEO Satellite1

2212 Inter-Satellite Link

2226 Low Interference

UT (Ka)

2222

LEO Gateway2 (Ka,V,Q)

2216B

2224

2228

UT (Ku)

IP Core Networks

2218

LEO Gateway1 (Ka,V,Q)

2216A

2220 To/From Servers

INTERFERENCE MITIGATION ACROSS MULTIPLE CONSTELLATIONS IN A SATELLITE COMMUNICATION SYSTEM

BACKGROUND

The need for high-speed broadband connections is universally important throughout the world. Many areas are not served or are underserved by fiber, cable, and/or other terrestrial systems for providing broadband coverage. Satellite systems can provide global high-speed coverage and may reach areas unserved or underserved. Thus, there is a significant need for new and improved mechanisms for providing satellite-based communication systems coverage.

Satellites which provide satellite-based broadband communication may be located at different altitudes above the earth. Satellites in a Low Earth Orbit (LEO) are typically about 2000 km and below. A Geostationary Orbit (GEO) satellite is 35,786 km above the earth. A Medium Earth Orbit (MEO) is greater in altitude than that of the LEO and less than that of the GEO, or about 2000 km to 35,786 km. As used herein, a constellation is a group of satellites at a given altitude.

SUMMARY

An example of disclosed systems herein can include a satellite communication system with a first satellite constellation with a plurality of satellites; and a second satellite constellation with at least one satellite; wherein the satellite communication system mitigates interference for an in-line event where a main lobe of a satellite of the first constellation and a main lobe of a user terminal communicating with the satellite of the second satellite constellation intersect sufficiently to cause interference more than a threshold amount on a common frequency band of a link of the satellite of the first constellation and the user terminal.

An example of disclosed systems herein can include a method of communicating on a multi-satellite communication system including providing a first satellite constellation with a plurality of satellites; and providing a second satellite constellation with at least one satellite; obtaining data to determine an in-line event; determining when an in-line event will occur; mitigating interference when an in-line event occurs where a main lobe of a satellite of the first constellation and a main lobe of a user terminal communicating with the satellite of the second satellite constellation intersect sufficiently to cause significant interference on a common frequency band of a link to the satellite of the first constellation and the user terminal.

An example of disclosed systems herein can include a satellite communication system with a first satellite constellation with a plurality of satellites; and a second satellite constellation with at least one satellite; a network management server; wherein: the network management server mitigates interference when an in-line event occurs where a main lobe of a satellite of the first constellation and a main lobe of a user terminal communicating with the satellite of the second satellite constellation intersect sufficiently to cause significant interference on a common frequency band of the satellite of the first constellation and the user terminal, the in-line event is determined from a relative position of the satellites and the user terminal by the network management server using data from a gateway position database and a satellite ephemeris database, mitigation of the interference comprises resource consolidation that switches Ka band traffic to a V or Q band when resources on the V or Q band are available, mitigation of the interference comprises resource diversion that switches traffic to an alternate link when resources on the V or Q band are not available.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
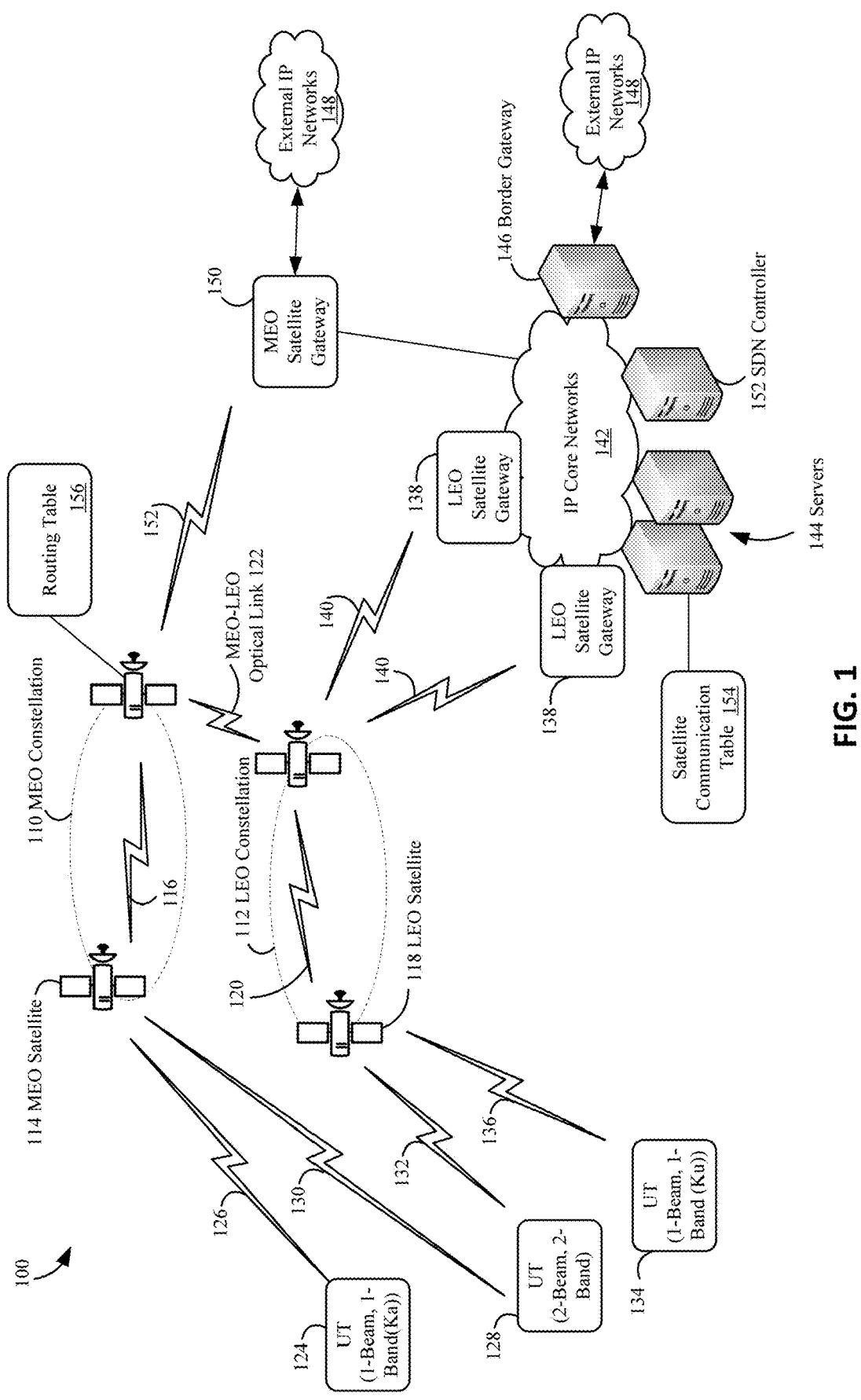
FIG. 1 is a diagram showing an example implementation of the MEO-LEO system according to the instant disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The instant disclosure describes a technical solution to the problem of interference in satellite communication systems that combine the benefits of Medium Earth Orbit (MEO) and Low Earth Orbit (LEO) satellite systems into an integrated MEO-LEO satellite communication system. In the illustrated examples, the MEO satellites' user links operate in the Ka band and the MEO gateway links in the Ka, V/Q and E bands. The overlap of common transmission bands leads to the possibility for interference. The disclosure is directed to interference mitigation techniques for these overlaps in transmission bands in a satellite communication system, particularly a satellite system with multiple constellations. As described herein, the LEO gateway links can switch to V/Q band, as necessary to assist in resolving in-line events between Ka Gateway links for LEO and Ka user links for MEO. Likewise, the MEO satellites can utilize E-band when needed due to in-line events or capacity needs. Other mitigation techniques for in-line events between a LEO Gateway link that use Ka and MEO user link (that also uses Ka)

include switching to a different gateway for the LEO satellite such that there is not an in-line event. Another mitigation technique for in-line events described herein is adaptive beam nulling that suppresses beam response in the direction of interference vector.

The MEO-LEO communication system described herein includes an LEO constellation combined with a MEO constellation where the LEO constellation may provide global coverage with broad average capacity and may support 'hot spot' coverage where desired. The MEO constellation may provide unique advantages including backhaul to ground in remote areas (such as but not limited to deep ocean areas), higher traffic density for key locations, and a secure global backhaul for key customers. Data may be routed over optical inter-satellite links using Software Defined Networking (SDN) concepts to provide: (1) MEO-LEO (backhaul and ground access); (2) LEO-LEO (upstream & downstream); and (3) MEO-MEO (crosslinks & downlinks). Further, implementations described herein include secure user terminal (UT) to UT IP routing in the constellation for direct UT to UT communication.

The LEO and MEO constellation satellites may form a mega constellation comprising many satellites orbiting the Earth. Such a mega constellation may include hundreds or even thousands of satellites. Communications are facilitated using intra-constellation and inter-constellation cross links as described herein. Technical benefits of a MEO-LEO satellite system include global consumer and enterprise Internet Protocol (IP) data, and the ability to provide secure IP data services between users and/or enterprises without traversing gateways and associated terrestrial links. Another technical benefit is SDN routing capabilities that provide complete functionality at any stage of deployment. Routes are determined by a central ground controller, and routing tables are uplinked to satellites. An implementation of SDN routing is described further below with reference to the route management function (RMF). The RMF receives link status from the satellites and determines simple routing tables which are uploaded to the satellites. The routing tables allow the satellites to route data based on a satellite ID placed in a data header. The RMF thus solves the problem of creating and maintain large routing tables to reduce the memory and computing load on satellite resources. Yet another technical benefit of the MEO-LEO satellite system is that Space-based Phased Array antenna support multiple modes to provide support for hot-spots and high-density areas, uniform density coverage, and "earth fixed" operation and "satellite fixed" operation narrowband operations with improved link margins.

FIG. 1 is a diagram showing an example implementation of the MEO-LEO system 100 according to the instant disclosure. The specific implementation shown in FIG. 1 is just one possible implementation of a MEO-LEO system according to the instant disclosure. Other implementations may include additional components and/or a different number of components than those shown in FIG. 1. The example implementation of the MEO-LEO system 100 shown in FIG. 1 includes a MEO constellation 110 and a LEO constellation 112. The MEO constellation 110 has a number of MEO satellites 114. The MEO satellites 114 may be interconnected by MEO links 116 between the satellites as described further below. Similarly, the LEO constellation 112 has a number of LEO satellites 118 interconnected by LEO links 120 between the LEO satellites 118. The MEO links 116 and the LEO links 120 may be optical links or RF links. The LEO and MEO satellites may be connected by an MEO-LEO optical link 122 as described further below. The MEO constellation 110 and the LEO constellation 112 may have any number of satellites as described further below.

The MEO-LEO system 100 further includes a number of user terminals (UT) that communicate with the MEO satellites 114 and the LEO satellites 118. A first user terminal 124 communicates over a single beam 126, on a single Ka band, to the MEO satellites 114. A second user terminal 128 communicates with two beams 130, 132 to the satellites. The first beam 130 is on the Ka band and communicates with the MEO satellites 114. The second beam 132 is on the Ku band and communicates with the LEO satellites 118. A third user terminal 134 communicates over a single beam 136 with a single, Ku band, to the LEO satellites 118.

Referring again to FIG. 1, the MEO-LEO system 100 may include a number of satellite gateways that also communicate with the satellites. LEO satellite gateways 138 may communicate with LEO satellites 118 over one or more beams and one or more bands. In the illustrated examples, the LEO gateways 138 communicate with the LEO satellites 118 over a combination of Ka and Q/V bands 140. The LEO satellite gateways 138 communicate over an internet protocol (IP) core network 142 with one or more servers 144. The servers 144 may include subscription, security, management and application servers. The IP core network 142 may also include a border gateway 146 for connecting to external IP networks 148. MEO satellite gateways 150 may communicate with MEO satellites 114 over one or more beams and one or more bands. In the illustrated examples, the MEO gateways 150 communicate with the MEO satellites 114 over a combination of Ka, Q/V, and E bands 152.

The MEO-LEO system 100 may further include a software defined network (SDN) controller 152. The SDN controller 152 in the example MEO-LEO system 100 shown in FIG. 1 is located on the IP core network 142. Alternatively, the SDN controller 152 may be located within the satellite gateways 138, 150. Since power on a satellite is limited, it is desirable to put the SDN controller function on the ground where power is more readily available. Placing the complex SDN controller function on the ground also system 100 may further include a satellite communication table 154 connected to a server 144 for storing user terminal connection data as described further below. In addition, the satellites 114, 118 may also include a routing table 156 as described below.

In some implementations, the MEO-LEO system 100 may provide hot spot coverage. As used herein, hot spot coverage means that there are certain regions in the coverage area where there is a significantly higher demand compared to other regions and the system provides the capability to allocate commensurate satellite resources (frequency and power) to satisfy the demand.

Figure 2:
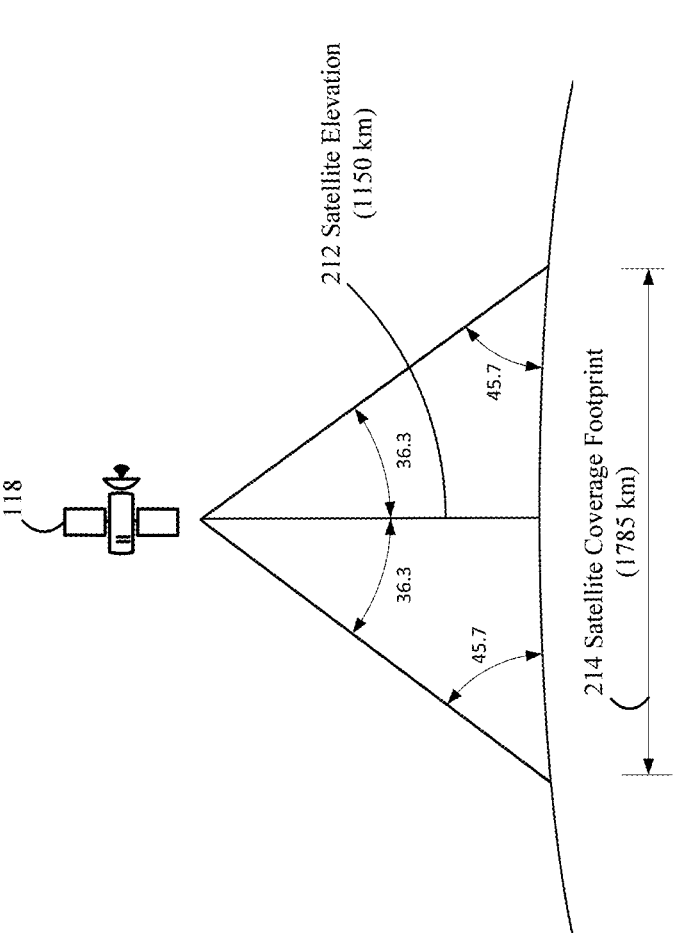
FIG. 2 shows LEO constellation parameters for an example constellation with 864 satellites.

FIG. 2 shows LEO constellation parameters for an example constellation with 864 LEO satellites. In this example, the LEO satellites 118 have a satellite elevation 212 of 1150 km. This satellite elevation 212 provides a satellite coverage footprint 214 of 1785 km on the earth's surface. The constellation Height is 1150 km with 36 planes and 24 satellites per plane. The minimum UT Elevation is 45.7 degrees. However, with a phased array antenna, it is also possible to cover Alaska (up to 71.2° N) with satellite steering of 52.76° to allow user terminals in Alaska to operate at elevation angles of ~20 degrees with parabolic dishes even with partial constellation. The satellites 118 include a Ku user link and one or more Ka and V/Q Gateway links. The user link uses a phased array antenna. Each satellite 118 includes optical inter-satellite links as described further below. Both left hand circular polarization (LHCP) and right hand circular polarization (RHCP) may be used in user links and Gateway Links. The satellites 118 have 16 GHz user spectrum per satellite providing 32 Gbps per satellite. The user data rate in the forward link is 1 Gbps per 500 MHz channel. As used herein, a plane is a specific orbit in which one or more satellites revolve around the earth. A plane is typically identified by altitude, inclination, longitude of ascending node etc.

Table 1 summarizes some representative LEO system parameters for the example LEO constellation 112 shown in FIG. 1.

TABLE 1

Figure 3:
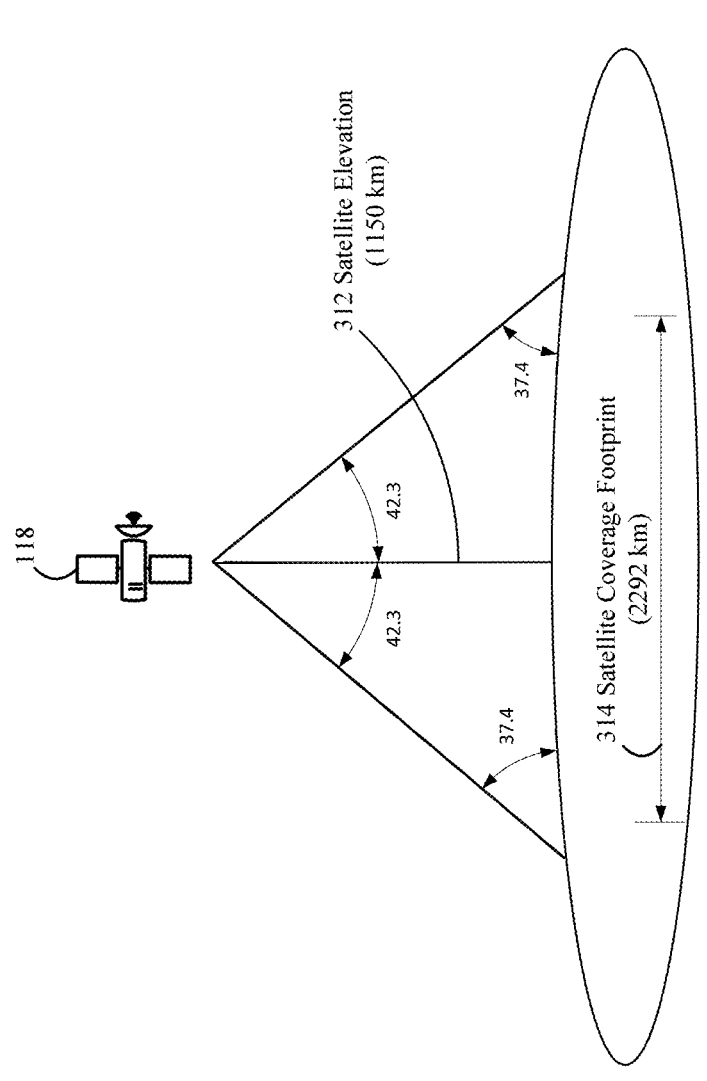
FIG. 3 shows LEO constellation parameters for an example constellation with 432 satellites.

| Attribute | LEO Constellation | Notes |
|---|---|---|
| Orbit | Inclined 55 degrees | Targeted coverage +/−55 deg latitude |
| Height | 1150 km | |
| Beams | Phased array | Phased array provides flexible coverage |
| Foot-print | Earth-fixed and satellite fixed | Hot-spots, high bandwidth options |
| Transponder | Digital processing | Improved throughputs, facilitate routing |
| ISL | Yes | In-plane cross-link, MEO-LEO cross link |
| User link polarization | Both polarizations | Improved capacity and density |
| Bandwidth - Forward Beam | Up to 4 GHz | 2 GHz per polarization |
| Capacity Density | High | Result of constellation and phased arrays |
| Waveform | DVB-S2X/LDPC | Stronger link, more efficient |
| Switching, management Protocols | 5G | Better QoS handling, Multiple RAT |
| Total Satellites | Up to 1440 | |
| Gateway antenna size | 3.0 m | |
| User antenna size | 40 cm to 1.2 m | |
| Capacity Density (Max) | 2.6 Mbps/sq-km | | allows for a simplified router on the satellite where the satellite router simply routes the data according to instructions received from the SDN controller 152. The SDN controller 152 receives information about conditions of the various links in the MEO-LEO system 100 and calculates a route for data through the system based on the condition of the links. Examples of the MEO-LEO links and routing through these links are described further below. The satellite FIG. 3 shows representative LEO constellation parameters for an example constellation with 432 LEO satellites. In this example, the LEO satellites 118 have a satellite elevation 312 of 1150 km. This satellite elevation 312 provides a satellite coverage footprint 314 of 2292 km on the earth's surface. The constellation Height is 1150 km with 18 planes and 24 satellites per plane. The minimum UT Elevation is 37.4 degrees. However, with a phased array antenna, it is also possible to cover Alaska (up to 71.2° N) with satellite steering of 53.6° to allow user terminals in Alaska to operate at elevation angles of ~18 degrees with parabolic dishes even with partial constellation. The satellites 118 include a Ku user link and one or more Ka and V/Q Gateway links. The user link uses a phased array antenna. Each satellite 118 includes optical inter-satellite links as described further below. Both LHCP and RHCP in user links and Gateway Links. The satellites 118 have 16 GHz user spectrum per satellite providing 32 Gbps per satellite. The user data rate in the forward link is 1 Gbps per 500 MHz channel.

Table 2 summarizes some representative MEO system parameters for the example MEO constellation 110 shown in FIG. 3.

TABLE 2

| Attribute | MEO Constellation | Notes |
| --- | --- | --- |
| Orbit | Inclined 55 degrees | Targeted coverage +/−55 deg latitude |
| Height | 8000 km | |
| Beams | Phased array | Phased array provides flexible coverage |
| Foot-print | Earth-fixed | Hot-spots, high bandwidth options |
| Transponder | Digital processing | Improved throughputs, routing |
| ISL | Yes | In-plane cross-link, MEO-LEO cross link |
| User link polarization | Both polarizations | Improved capacity and density |
| Bandwidth - Forward Beam | Up to 4 GHz | 2 GHz per polarization |
| Capacity Density | Very High | Result of constellation and phased arrays |
| Waveform | DVB-S2X/LDPC | Stronger link, more efficient |
| Switching, management Protocols | 5G | Better QoS handling, Multiple RAT |
| Total Number of Satellites | 64 | |
| Gateway antenna size | 3.0 m | |
| User antenna size | 1.2 m, 21.5 dB/K | Can use smaller antenna with capacity loss |
| Capacity Density (Max) | 400 kbps/km^2 | Max over 30,000 km^2 |

Ground System deployment may be incremental based on user traffic demand. Gateways may be placed in areas where coverage is required. Inter-satellite links may be used for the backhaul. Another technical benefit of the MEO-LEO satellite system is that MEO requires fewer gateways. For example, 6-8 gateways may be sufficient for global coverage.

Figure 4:
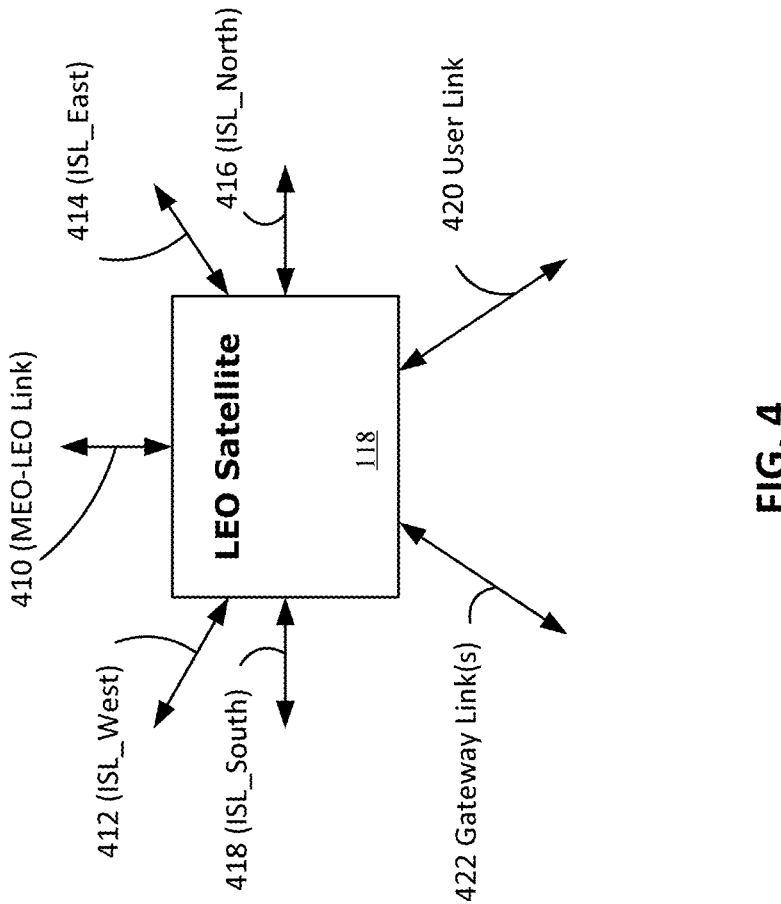
FIG. 4 shows an example of a LEO satellite that may be used with the techniques of the instant application.

FIG. 4 shows an example of the LEO satellite 118 described above in the LEO constellation 112. The LEO satellite 118 in this example is configured with link hardware to support five Inter-Satellite Links (ISLs) to adjacent LEO satellites. The ISLs are preferably optical links. The ISLs include a MEO-LEO optical link 410 that connects the LEO satellite 118 to a MEO satellite 114 in the MEO constellation 110 as shown in FIG. 1. The MEO-LEO optical link 410 is preferably a high bandwidth to provide backhaul to LEO satellites. As used herein, "backhaul" refers to a network connection transmitting a signal from a remote site or network to another site or network. The LEO satellite 118 includes east and west optical links (ISL-East 414, ISL-West 412) that connect the satellite 118 to adjacent satellites in adjacent planes to the east and west respectively. The LEO satellite 118 further includes north and south optical links (ISL-North 416, ISL-South 418) that connect to adjacent satellites in the same plane to the north and south. The LEO satellite 118 further includes a user link 420 and gateway links 422. The user link 420 includes a Ku-band phased array user link antenna. In this example, the gateway links include two Ka-band and a Q/V band gateway links for backhaul. The Ku antenna can also link backhaul traffic to a gateway if needed. In this example, the total Ku-band RF transmit power 80 Watts.

Figure 5:
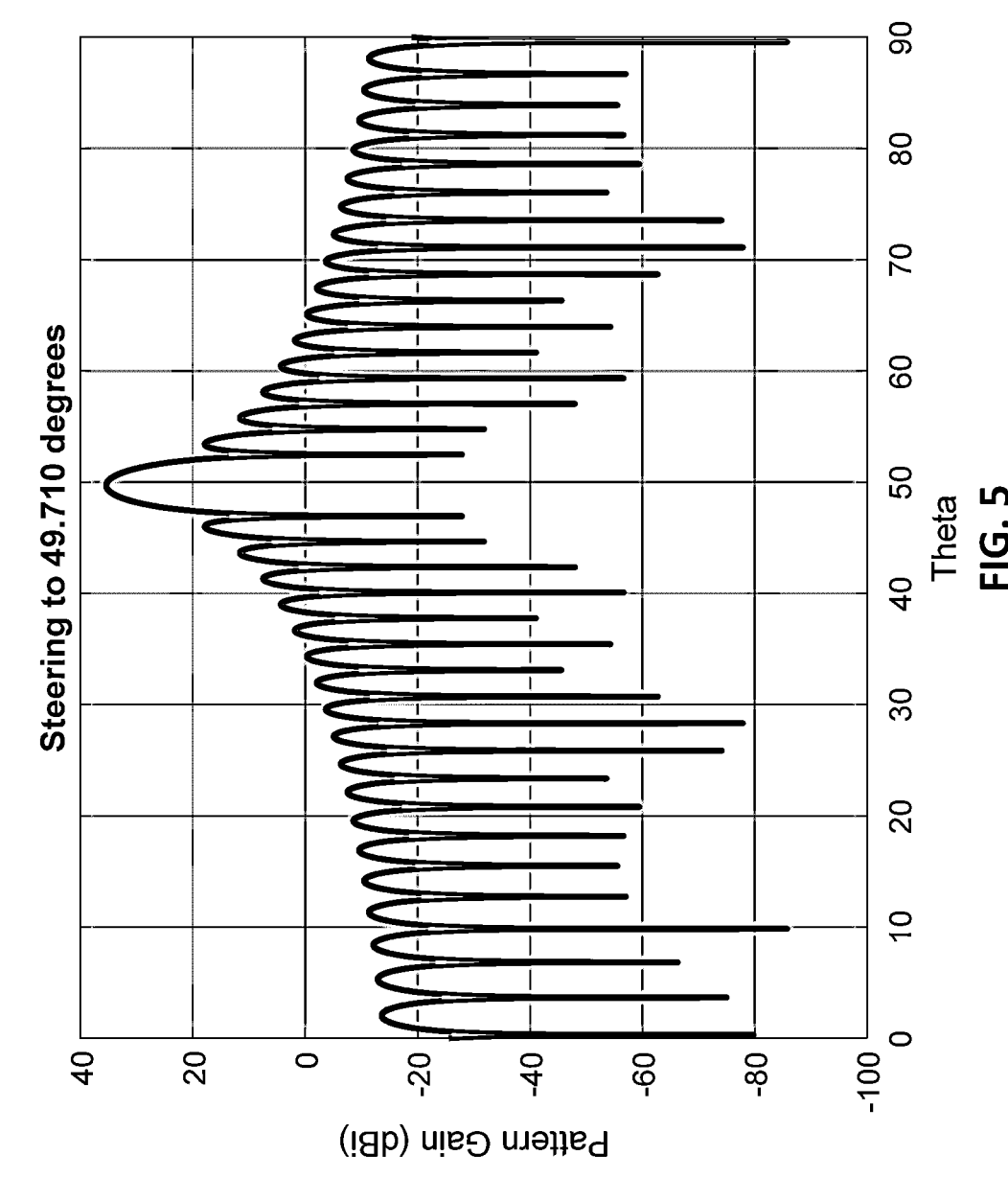
FIG. 5 is a diagram showing the LEO Gateway Link Antenna Pattern Using Bessel Function (ES Elev. 25 degrees).

FIG. 5 is a diagram showing the LEO gateway link antenna pattern using Bessel Function (ES Elev. 25 degrees). The gateway link antenna provides beam steering to 49.710 degrees.

Figure 6:
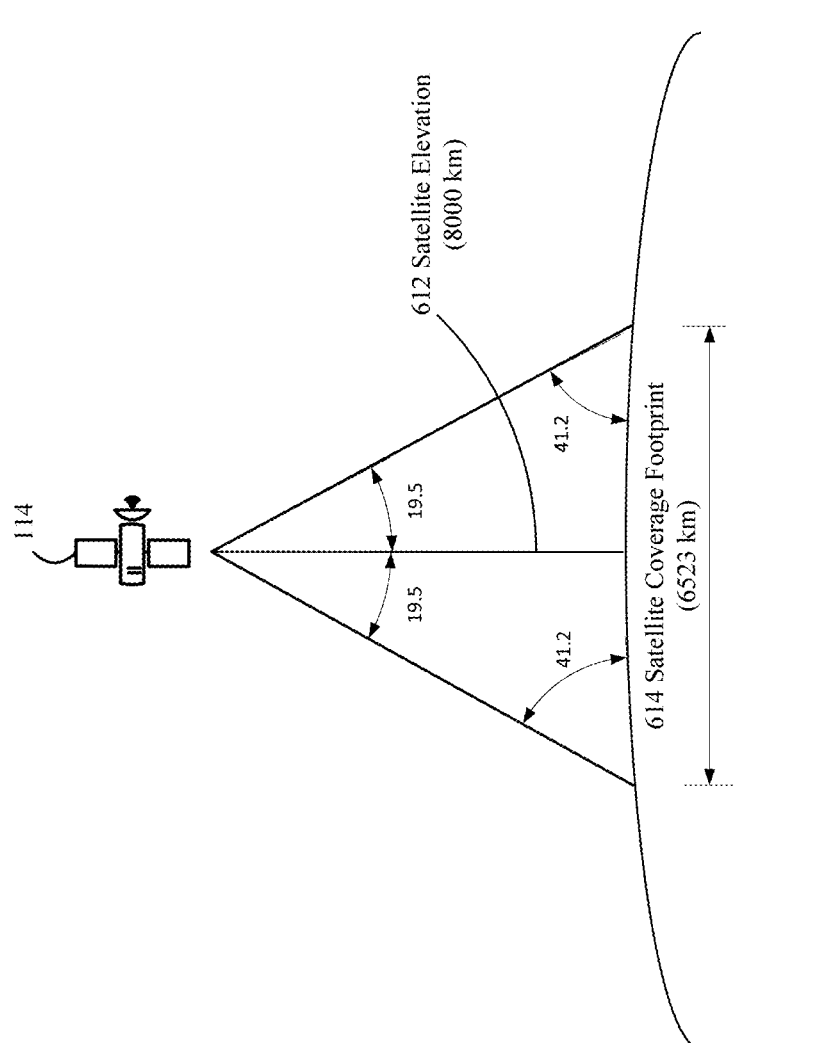
FIG. 6 shows MEO constellation parameters for an example constellation satellite.

FIG. 6 shows MEO constellation parameters for an example MEO constellation with 64 MEO satellites 114. In this example, the MEO satellites 114 have a satellite elevation 612 of 8000 km. This satellite elevation 612 provides a satellite coverage footprint 614 of 6523 km on the earth's surface. The constellation has 8 planes with 8 satellites per plane. The minimum UT Elevation is 41.2 degrees. Like the LEO satellites described above, the MEO satellite 114 can use satellite steering to cover further north to Alaska. The satellites 118 include a Ka band user link and one or more Ka, V/Q and E gateway links. The user link uses a phased array antenna. Each satellite 114 includes optical inter-satellite links as described further below. Both LHCP and RHCP are used in the user links and gateway links. The satellites 114 have 48 GHz user spectrum per satellite providing about 100 Gbps per satellite.

Figure 7:
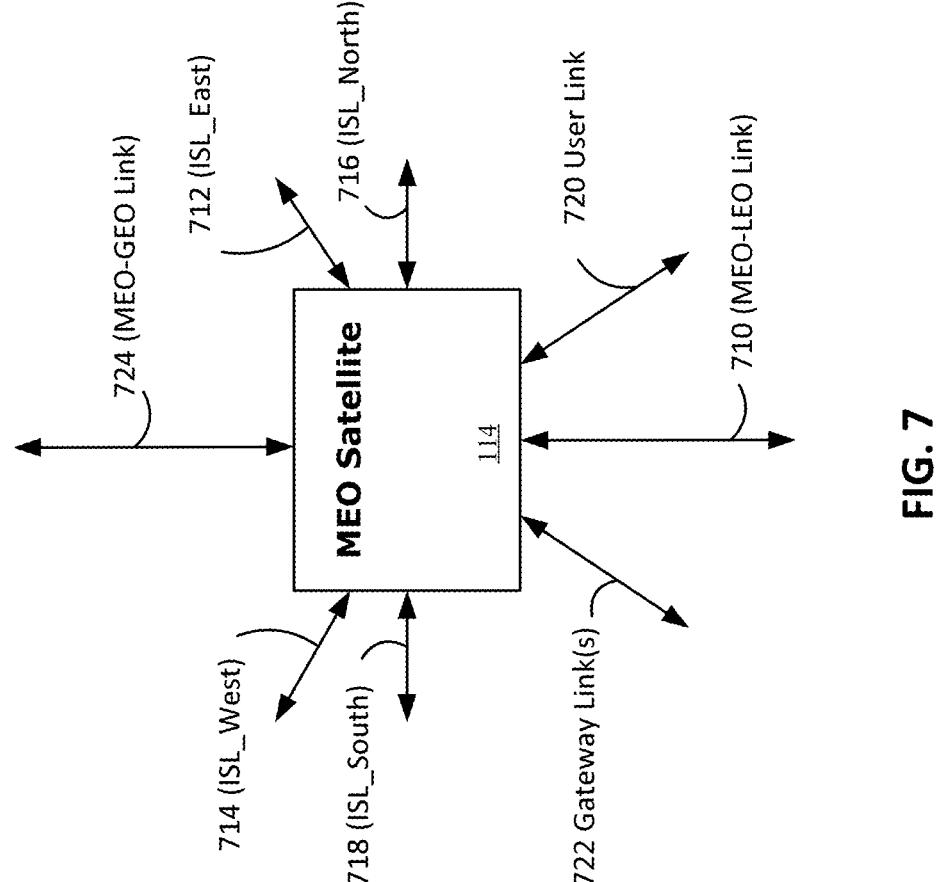
FIG. 7 shows an example of a MEO satellite that may be used with the techniques of the instant application.

FIG. 7 shows an example of the MEO satellite 114 described above in the MEO constellation 110. The MEO satellite 114 in this example includes six ISLs to adjacent LEO satellites. The ISLs include a MEO-LEO optical link 710 that connects the satellite 114 to an LEO satellite 118 in the LEO constellation 112 as shown in FIG. 1. The MEO-LEO optical link 710 is preferably a high bandwidth to provide backhaul to LEO satellites. The MEO satellite 114 includes east and west optical links (ISL-East 712, ISL-West 714) that connect the satellite 114 to adjacent satellites in adjacent planes to the east and west respectively. The MEO satellite 114 further includes north and south optical links (ISL-North 716, ISL-South 718) that connect to adjacent satellites in the same plane to the north and south. The MEO satellite 114 further includes a user link 720 and gateway links 722. The user link 720 includes a Ka-band user link with a phased array antenna. In this example, the gateway links include four Ka-band and a Q/V band gateway links for backhaul. The Ka antenna can also link backhaul traffic to a gateway if needed. In this example, the total Ka-band RF transmit power 100 Watts. The MEO satellite 114 may further include a MEO-GEO link 724 to a geosynchronous satellite. The MEO-GEO link 724 may be an optical link similar to the MEO-LEO optical link 710 disposed on the satellite facing geosynchronous satellite located above the MEO satellite 114.

Figure 8:
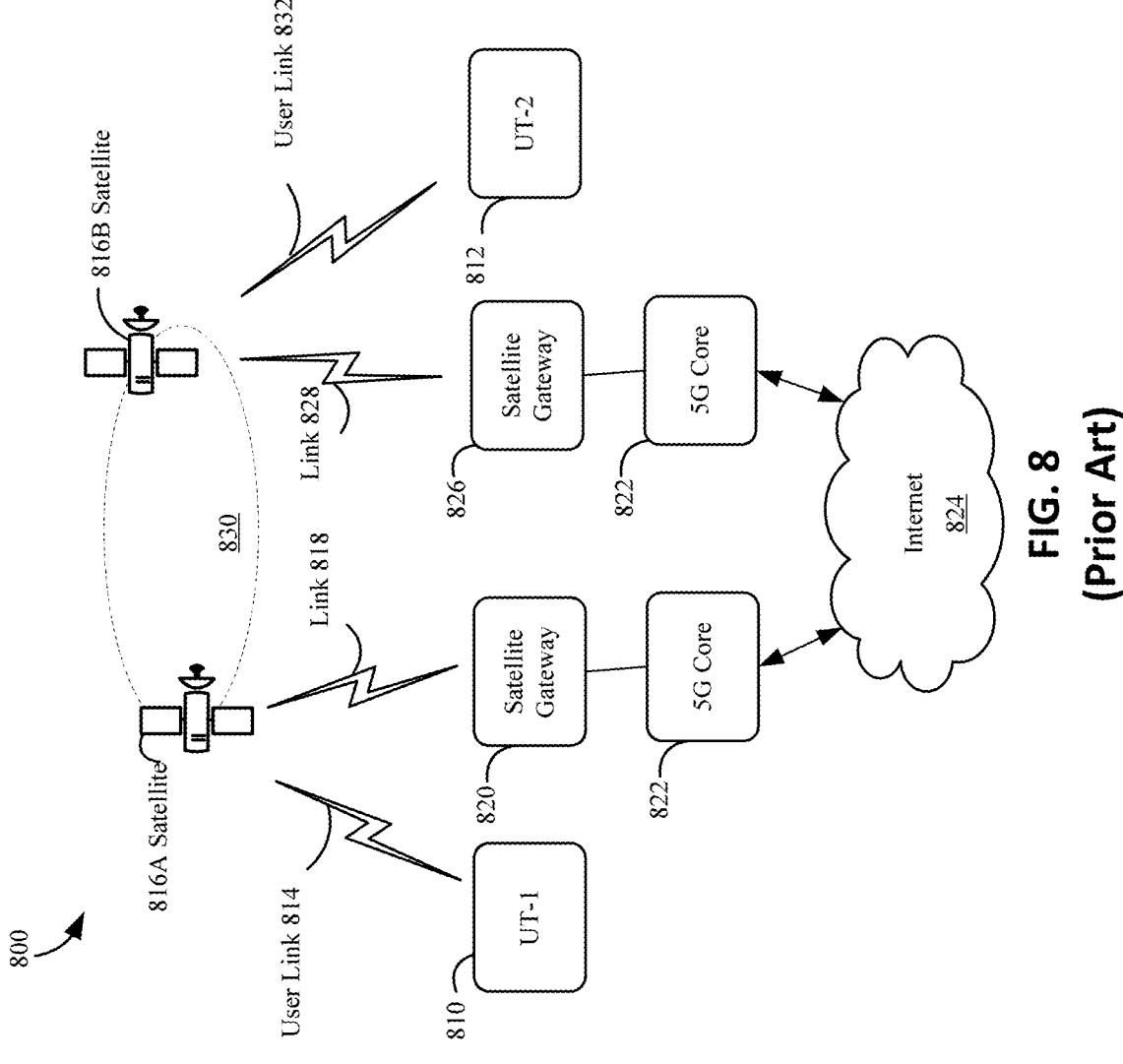
FIG. 8 illustrates a satellite communication system according to the prior art.

FIG. 8 shows a satellite communication system 800 which illustrates prior art communication in a satellite system. A first user terminal (UT1) 810 connects to and communicates with a second user terminal 812 through the satellite system 800 and terrestrial network. The satellite system may have one or more satellites shown here as satellite 816A and 816B and collectively referred to as satellites 816. The first user terminal 810 connects via a user link 814 to a first satellite 816A. The first satellite 816A communicates with a first satellite gateway 820 over a link 818. The first satellite gateway 820 sends data through a terrestrial network to a second satellite gateway 826. In this example, the first satellite gateway 820 communicates with a 5G core network 822 to the internet 824. Data is sent over the internet 824 through the 5G core network 822 to the second satellite gateway 826. The second satellite gateway 826 send the data over a second link 828 to satellite 816B. The second satellite 816B then sends the data to the second user terminal (UT-2) 812 over a user link 832. The user links 832, 814 may be similar to user links 132, 136 as described above with reference to FIG. 1. The satellites 816A, 816B may be the same satellite or different satellites in either an LEO or MEO constellation 830 but not both.

In the prior art, as shown in FIG. 8, packets originating from a first user terminal (UT1) under one satellite are brought down to a corresponding gateway on the ground and routed on terrestrial links to a second gateway under a satellite (the same satellite or a different satellite in the same or a different constellation) that is connected to a second user terminal (UT-2). Traditional non-geostationary constellations are either at LEO or MEO. LEO and MEO constellations can have intra-constellation optical or RF cross-links. The described implementations herein provide interconnected LEO and MEO satellites with cross-links not just within a constellation but also between LEO and MEO constellations. LEO and MEO constellations can advantageously be using different frequency bands in user links. For example, Ku band for LEO and Ka band for MEO. A given user terminal may be capable of Ku only, Ka only or both Ku and Ka. In implementations herein, two user terminals may directly communicate with each other regardless of their band capabilities. Direct communication between two user terminals without touching the ground has the significant advantage of providing the highest security. As described herein, packets originating from a first UT under one constellation can be routed to a second UT under a different constellation entirely in the constellation without being routed on any terrestrial networks.

Figure 9:
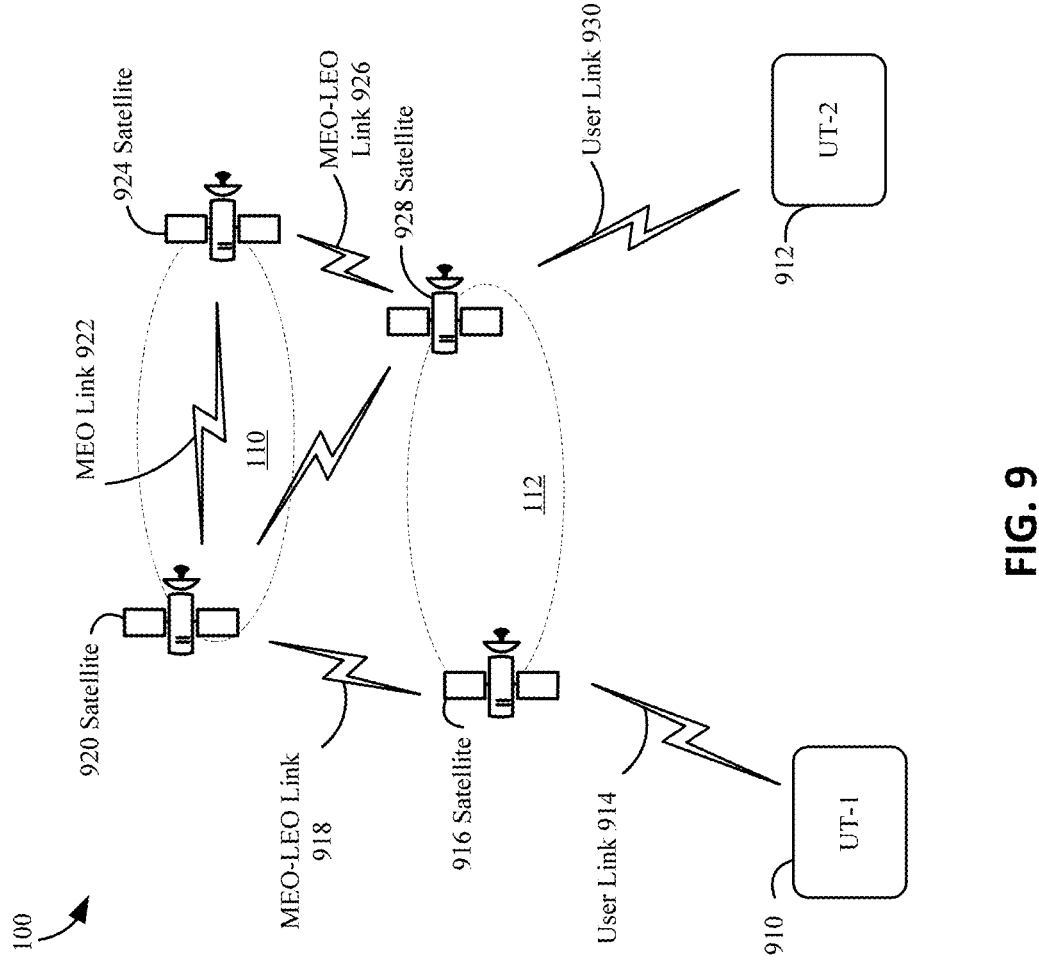
FIG. 9 is a diagram showing a first scenario for UT-UT connectivity.
Figure 10:
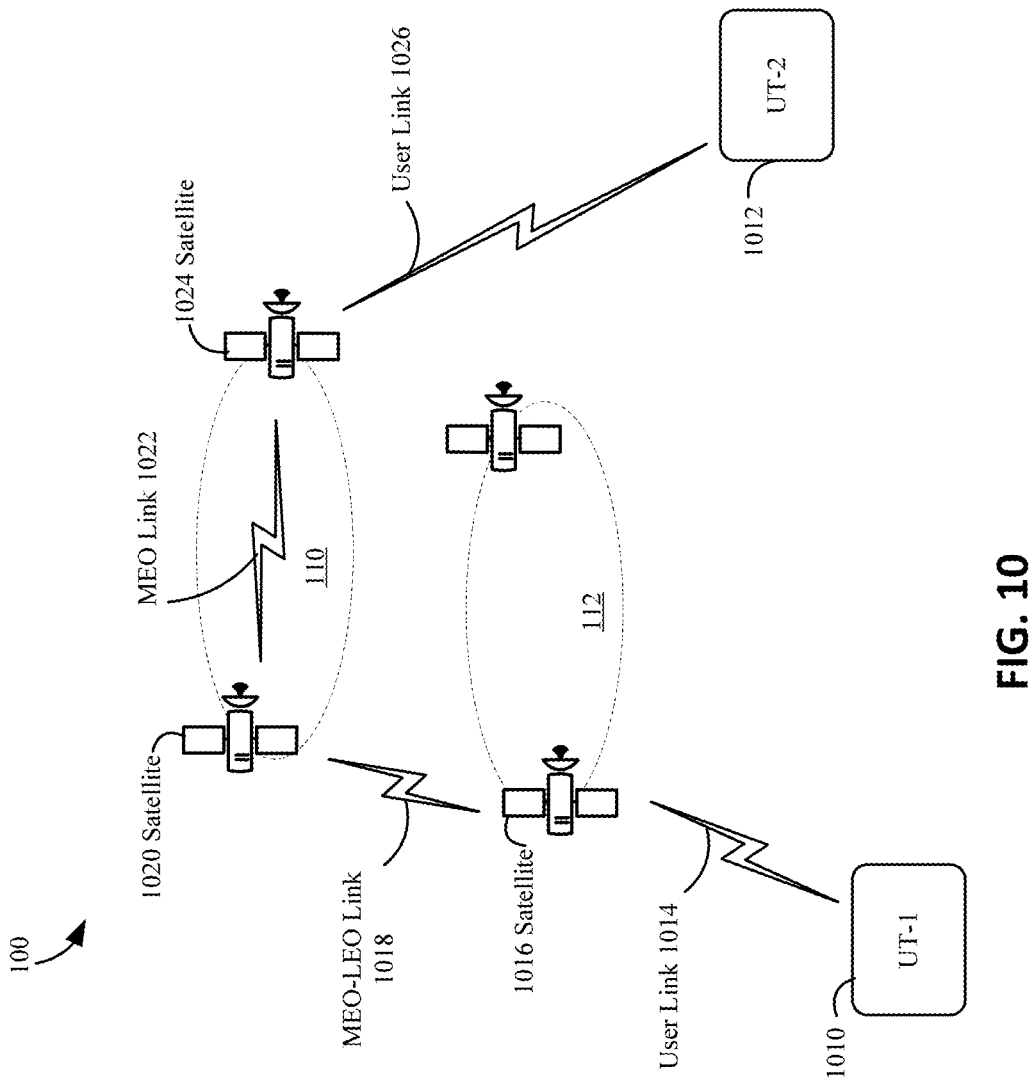
FIG. 10 is a diagram showing a second scenario for UT-UT connectivity.

FIGS. 9 and 10 illustrate two examples for data connectivity between user terminals without traversing terrestrial links. Many entities such as governments, businesses, or other enterprises may benefit from a point-to-point secure data link. A data link that does not traverse terrestrial data links reduces exposure to security risks of terrestrial links that are not controlled by the entity.

FIG. 9 presents a first example of point-to-point connectivity between user terminals without traversing terrestrial links. A first user terminal (UT1) 910 connects to and communicates with a second user terminal (UT-2) 912 through the MEO-LEO system 100. The user terminals 910, 912 may be physically located at virtually any point on the surface of the Earth. The first user terminal 910 connects via a user link 914 to a LEO satellite 916. The user link 914 may be similar to user links 132, 136 as described above with reference to FIG. 1. The LEO satellite 916 is a satellite in the LEO constellation 112. The LEO satellite 916 communicates over a MEO-LEO link 918 with a MEO satellite 920 in the MEO constellation 110. In a first example, the MEO satellite 920 communicates over a MEO link 922 to a second MEO satellite 924. The second MEO satellite 924 communicates over another MEO-LEO link 926 to a LEO satellite 928. The LEO satellite 928 the communicates over a user link 930 with the second user terminal 912. Alternatively, in a second example, the first MEO satellite 920 may communicate directly with the LEO satellite 928, thus not needing the MEO link 922.

FIG. 10 is a diagram showing a second scenario for connectivity between user terminals. A first user terminal (UT1) 1010 connects to and communicates with a second user terminal (UT-2) 1012 through the MEO-LEO system 100. The user terminals 1010, 1012 may be physically located at virtually any point on the surface of the Earth. The first user terminal 1010 connects via a user link 1014 to a LEO satellite 1016. The user link may be user links 132, 136 as described with reference to FIG. 1. The LEO satellite 1016 is a satellite in the LEO constellation 112. The LEO satellite 1016 communicates over a MEO-LEO link 1018 with a MEO satellite 1020 in the MEO constellation 110. In this example, the MEO satellite 1020 communicates over a MEO link 1022 to a second MEO satellite 1024. The second MEO satellite 1024 communicates over a user link 1026 with the second user terminal 1012.

The MEO-LEO system architecture lends itself to providing high availability and secure communication between two points on the earth without traversing terrestrial links. Software Defined Networking (SDN) based routing will allow appropriate routing via the MEO-LEO constellation to reach the intended destination. It is noted that the data path between two user devices does not go through a gateway link and therefore does not traverse any terrestrial link or facility. Although the illustration shows communication between two entities that are both Ku-band terminals, it is also possible for this type of secure connectivity between a Ku-band and Ka-band terminal. In such a case, the Ka link will be with MEO and Ku link will be with LEO. A route determination algorithm can determine the most optimal route via intra- and/or inter-constellation links.

Figure 11:
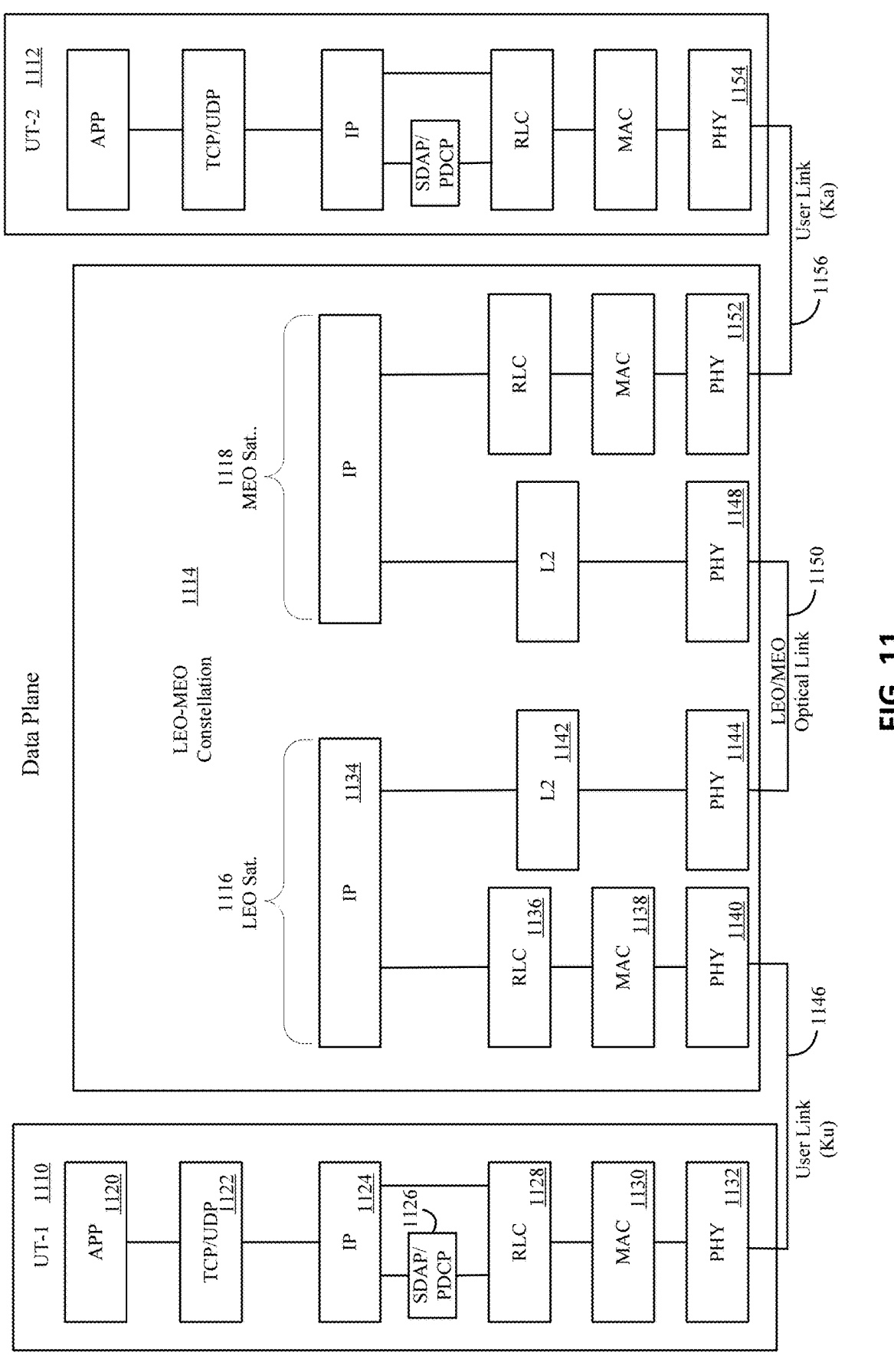
FIG. 11 illustrates an implementation of IP routing in a satellite system for secure UT to UT communication.

FIG. 11 illustrates an implementation of IP routing in a satellite system for secure UT to UT communication. FIG. 11 shows the data plane routing of the UT-UT communication. In this implementation, a first user terminal UT1 1110 is connected to a second user terminal UT-2 1112 via a LEO-MEO constellation 1114 comprising an LEO satellite 1116 and an MEO satellite 1118. The first user terminal UT1 1110 includes a representation of the user plane protocol stack. The user plane protocol stack includes from top to bottom, an application block 1120, a transmission control protocol/user datagram protocol (TCP/UDP) block 1122, an internet protocol (IP) block 1124, a service data adaption protocol/packet data convergence protocol block (SDAP/PDCP) block 1126, a radio link control (RLC) block 1128, a medium access control (MAC) block 1130 and a physical layer (PHY) block 1132. The second user terminal 1112 includes the same user plane protocol stack with these same blocks. Each of these blocks may function as known in the prior art. The LEO satellite 1116 also includes a representation of the user plane protocol stack. The user plane protocol stack in the LEO satellite 1116 includes an internet protocol (IP) block 1134, a radio link control (RLC) block 1136, a medium access control (MAC) block 1138 and a physical layer (PHY) block 1140, a layer 2 (L2) block 1142 and a second physical layer (PHY) block 1144. The MEO satellite 1118 has the same blocks in its user plane protocol stack.

Referring again to FIG. 11, the IP routing of UT to UT communication includes various links between the user terminals and the satellites. The PHY layer 1132 of the first user terminal 1110 is connected to the PHY layer 1140 of the LEO satellite 1116 via a user link 1146. In this example, the user link 1146 is a Ku band link. The PHY layer 1144 of the LEO satellite 1116 is connected to the PHY layer 1148 of the MEO satellite 1118 via a LEO/MEO optical link 1150 as described above. The PHY layer 1152 of the MEO satellite 1118 is connected to the PHY layer 1154 of the second user terminal 1112 via a second user link 1156. In this example, the user link 1156 is a Ka band link.

Figure 12:
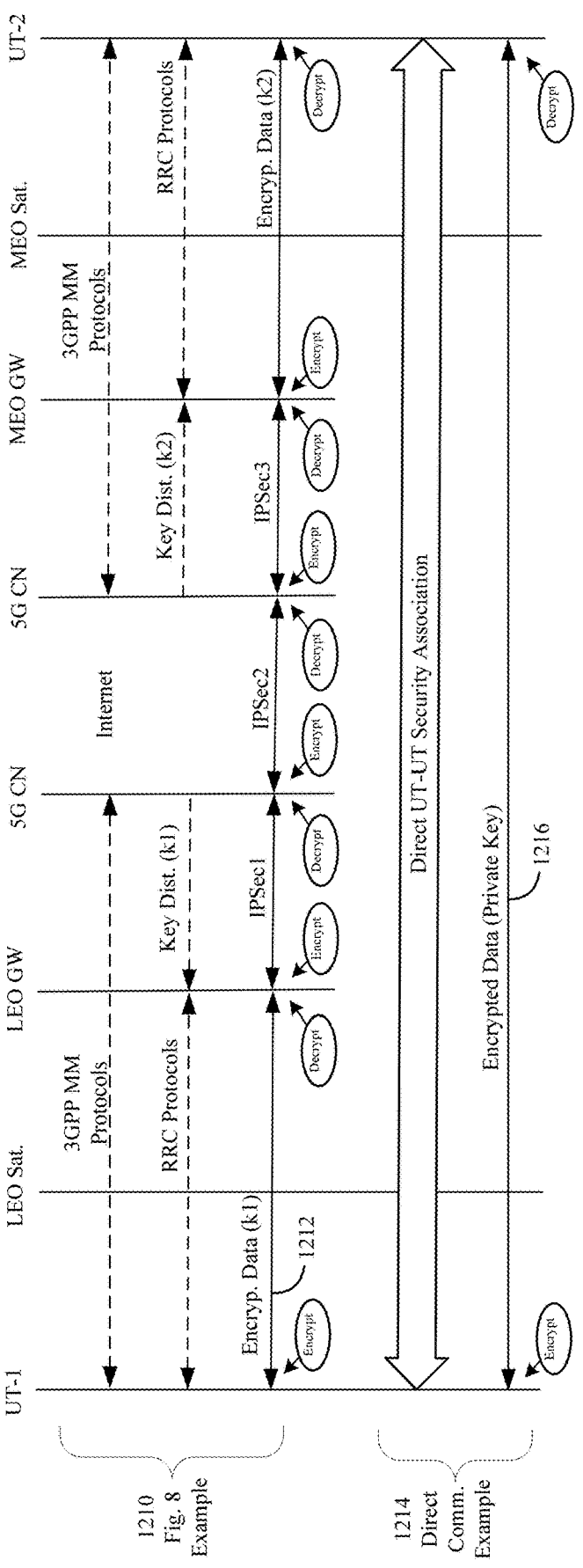
FIG. 12 is a data flow diagram for secure direct UT to UT communication in a satellite system.

FIG. 12 is a data flow diagram for secure direct UT to UT communication in a satellite system. FIG. 12 illustrates data flow from a first user terminal UT1 to a second user terminal UT-2. Data passes from UT1 through the network entities as follows: UT1-LEO satellite-LEO Gateway-5G Core Network-Internet-5G Core Network-MEO gateway-MEO satellite-UT-2. The top portion 1210 of the data flow diagram represents data flow in a satellite system as shown in FIG. 8. In this prior art data flow, encrypted data 1212 flowing from UT1 to UT2 undergoes encryption and decryption at each segment of the data path as shown. In contrast, the bottom portion 1214 of the data flow diagram represents direct UT-UT secure data flow in a satellite system as shown in FIGS. 9 and 10. As described herein, encrypted data 1216 flowing from UT1 to UT-2 undergoes encryption at UT1 and decryption at UT-2. The encrypted data 1216 flowing from UT1 to UT-2 is secured using a private key which protects the data throughout the entire data route.

Figure 13A:
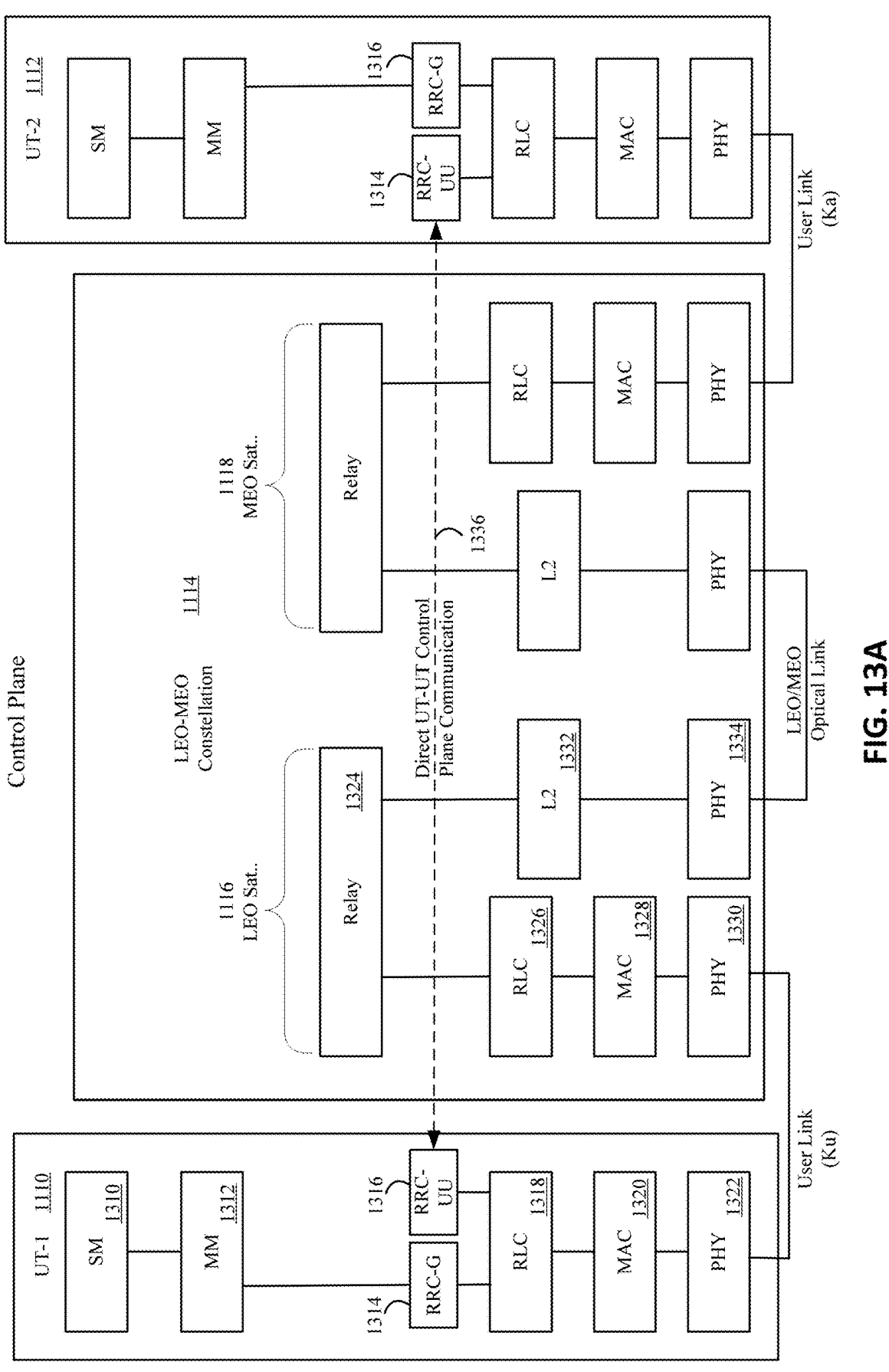
FIG. 13A illustrates an implementation of IP routing in a satellite system for secure UT to UT communication.

FIG. 13A illustrates an implementation of IP routing in a satellite system for secure UT to UT communication. FIG. 13 shows the control plane routing of the UT-UT communication for a system similar to that of FIG. 11. In this implementation, a first user terminal UT1 1110 is connected to a second user terminal UT-2 1112 via a LEO-MEO constellation 1114 comprising an LEO satellite 1116 and an MEO satellite 1118. The first user terminal 1110 includes a representation of the control plane protocol stack. The control plane protocol stack includes from top to bottom, an NAS-MM block 1310, an NAS-MM block 1312, a radio resource control gateway (RRC-G) block 1314, a radio resource control user-user (RRC-UU) block 1316, a radio link control (RLC) block 1318, a medium access control (MAC) block 1320 and a physical layer (PHY) block 1322. The second user terminal 1112 includes the same control plane protocol stack with these same blocks. Each of these blocks, with the exception of RRC-UU 1316, may function as known in the prior art. The LEO satellite 1116 also includes a representation of the control plane protocol stack. The control plane protocol stack in the LEO satellite 1116 includes a relay block 1324, a radio link control (RLC) block 1326, a medium access control (MAC) block 1328 and a physical layer (PHY) block 1330, a L2 block 1332 and a second physical layer (PHY) 1334. The MEO satellite 1118 has the same blocks in its user plane protocol stack. The RRC-UU block 1314 allows direct UT-UT control plane communication 1336 between the two user terminals as described further below.

An advantage of some implementations herein is direct communication between user terminals as introduced above. For example, a direct connection can be achieved between a first user terminal that can communicate with an LEO satellite and a second user terminal that can communicate with MEO satellite, or other routes through a satellite constellation as described above. A user terminal can initiate direct communication by knowing the IP address of another user terminal. IP packets transmitted by the first user terminal are received by the first satellite, for example an LEO- SAT. The RLC layer in the first user satellite may implement Layer-2 automatic repeat (ARQ) protocols to ensure error free reception of IP packets at the LEO-SAT. Layer-2 ARQ may be selectively applied based on traffic flow characteristics. For example, TCP based traffic flows undergo Layer-2 ARQ. However, UDP based traffic flows such as conversational voice may not undergo Layer-2 ARQ. The satellite (LEO-SAT) may inspect the destination IP address in a received IP header and consults its routing table to determine the next-hop for this packet. Routing table in each satellite is updated based on link state information in the constellation topology. Traditional method would be for user terminals to advertise its reachability based on the satellite the user terminal is communicating with.

In a satellite system where the satellites are moving, i.e. a satellite constellation with non-geosynchronous satellites such as LEO and MEO satellites, user terminals need to update reachability information every time there is a satellite handover at the user terminal. Every time there is a reachability update of the user terminal to a new satellite, all other routers in constellation should update their routing tables to maintain reachability. Updating reachability information upon each handover can add significant signaling overhead in the system. In implementations described below, this signaling overhead can be completely removed where the satellites autonomously update their routing tables without explicit reachability update information. The user terminals can take advantage of satellite handover signaling protocols to piggy-back reachability information to the satellite. However, this method requires updating routing tables in each satellite. Using piggy-back protocols can put a significant demand on system resources due to the size of the routing table in each satellite. As an example, if there are hundreds of thousands of user terminals that wish to be engaged in direct sessions, the size of the routing tables will need to be quite large. In addition to memory requirements, the large routing table creates a demand for quick search over large routing tables.

To mitigate the issue of updating large routing tables, in some implementations, satellite routers don't have to store and search routing tables that are the size of the user terminal population. Instead, the routing table size is limited to the size of the constellation, namely the number of satellites in the constellation. When a user terminal intends to initiate a direct session with another user terminal, the first user terminal may be provided with the satellite ID that second user terminal is communicating with at the beginning of the communication session. This can be provided by the gateways. The LEO and MEO gateways are constantly aware of the geo-locations of the individual user terminals that having active communications. A designated server on the ground is aware of the LEO or MEO satellite that the second user terminal is in communication with. The designated server may be one of servers 144 with the data of user terminals which are communicating with a satellite stored in a satellite communication table 154 as shown in FIG. 1. This designated server provides the satellite ID that the second user terminal is communicating with at the beginning of the direct session—for the purposes of this discussion we call this as the egress satellite to reach the second satellite.

Figure 13B:
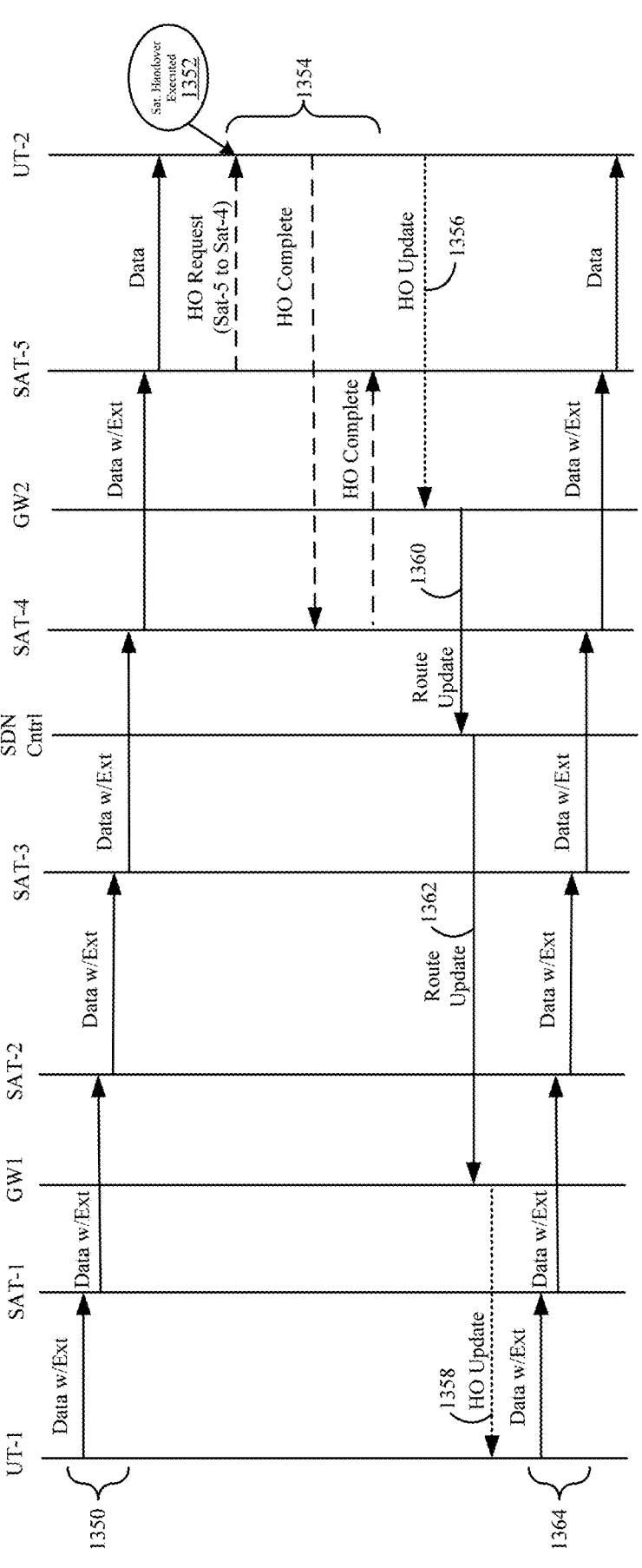
FIG. 13B illustrates a first example of direct communication between a first user terminal and a second user terminal.

FIG. 13B illustrates a first example of direct communication between a first user terminal and a second user terminal. In this implementation, the system uses extension IP headers to reduce the complexity and memory load required when using full routing tables as discussed above. Each IP data packet includes an extension IP header that contains the egress satellite's ID. Each entity in the system routes the data packet to the next entity based on the extension header of the data packet. Data may be sent through a combination of satellites and gateways to the destination user terminal. For example, data may use the point-to-point connectivity between user terminals without traversing terrestrial links as described with reference to FIG. 8 and FIG. 9. Alternatively, data may flow between user terminals using extension IP headers by passing through a combination of satellites and ground based gateways as shown in FIG. 13B.

In the illustrated example of FIG. 13B, a first user terminal UT1 sends an IP packet destined to a second user terminal UT-2. UT1 may inform UT-2 that it intends to communicate with UT-2 during security establishment handshake (not shown). The data communication using extension IP headers is illustrated as a data flow 1350 from UT1 to UT-2. Data from UT1 is first sent to SAT-1 with extension IP headers. SAT-1 receives the data IP packets from UT1 with an extension header, and simply inspects the egress satellite ID to make a determination where to send the data on the next-hop to reach egress satellite ID. The data flow 1350 continues in this example by SAT-1 sending the data through gateway GW1 to SAT-2. In a like manner, the data flow 1350 continues through SAT-3, SAT-4 and SAT-5 to user terminal UT-2. The data may flow 1350 through other gateways and a software defined (SDN) controller as shown. Similarly, when UT-2 communicates with UT1, the packets generated by UT-2 will have an extension header that points to the satellite UT1 which is communicating with UT-2.

When a user terminal is no longer able to be serviced by a non-stationary satellite, a handover to another satellite takes place as described above. In the illustrated implementation, when a handover of UT-2 to a different satellite takes place, UT-2 directly informs UT1 of the new satellite ID which is now handing data traffic of UT-2. Similarly, UT1 informs UT-2 about its satellite handover. Whenever a user terminal receives new satellite information about a user terminal it is communicating with, the extension header is appropriately updated. In this way, the satellites do not need to maintain a large table with IP addresses, they only need to maintain a table to reach a particular satellite in the constellation. A brief description of a handover is shown in FIG. 13B. The handover may be accomplished with a sequence of handshake signals 1354. When a handover request is received, a satellite handover 1352 is executed. The handover handshake signals 1354 may end with handover complete signals as shown. After the handover is complete, the UT-2 sends a handover update to inform UT1 of the new satellite ID it is communicating with. In this example, the handover update is accomplished using RRC-G signaling 1356 to gateway GW2. Router signaling 1360, 1362 can then be used to send the handover update to the next gateway GW1 via the SDN controller. RRC-G signaling 1358 can then be used to forward the handover update from GW1 to UT1. UT1, now having new satellite information about UT-2, updates the extension headers in data packets appropriately and again sends data 1364 to UT-2 as described above. This method of direct communication between user terminals eliminates the need for large routing tables. However, this method does require complex signaling via ground elements for the handover updates.

Figure 13C:
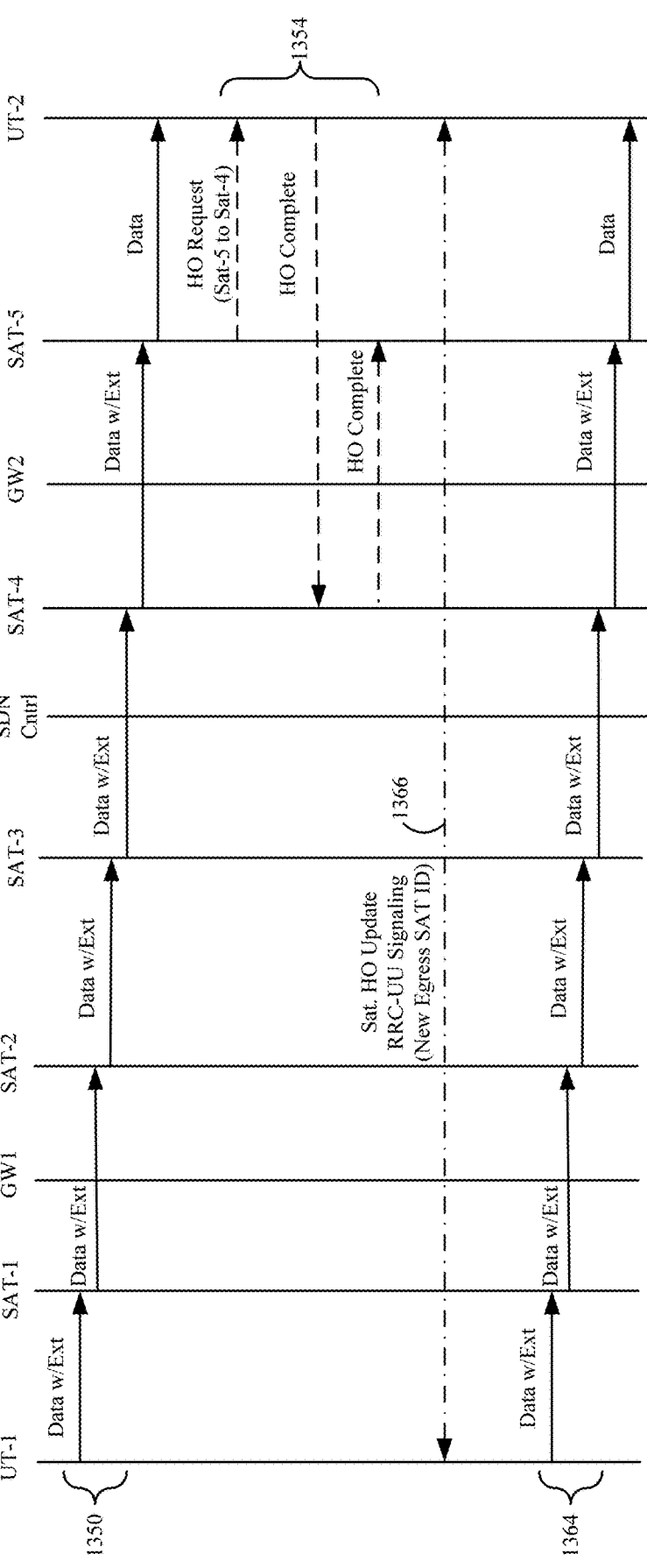
FIG. 13C illustrates a second example of direct communication between a first user terminal and a second user terminal.

FIG. 13C illustrates a second example of direct communication between a first user terminal and a second user terminal. In this example implementation, the system uses the RRC-UU 1316 introduced above for direct UT-UT control plane communication 1336 between the two user terminals. In this example, data flows 1350 from UT1 to UT-2, and a handover is handled 1354 as described above. After the handover is complete, UT-2 communicates with UT1 using RRC-UU layer protocol signaling 1366 to send UT1 the new egress satellite ID used by UT-2. The RRC-UU layer protocol signaling 1366 uses the RRC-UU 1316 in the protocol stack of the user terminals as described above. UT1 then uses the received information to update the egress router ID in the extension header for subsequent data sent 1364 to UT-2. Data is sent 1364 as described above where all satellites in the constellation only need to inspect the destination IP address in the extension header to route the packets to the correct egress router. Therefore, there is no need for routers to update their routing tables when a UT executes a satellite handover since it is the responsibility of UT to update the extension header. Further, since it is the user terminal's responsibility to populate the correct egress satellite ID in extension headers, the other satellites need not store information about individual user terminals.

It should be noted that once the packet reaches the intended egress satellite, the egress satellite must still determine the beam within the satellite where the user terminal can be reached. Each satellite maintains a list of active user terminals in each beam as part of normal radio resource function. Therefore, when a packet is received at the egress satellite, the satellite is aware of which beam the UT is located. Previous discussions were centered around constellation routing based on satellites inspecting destination IP address and extension headers. This implies that satellites have to implement IP layer and corresponding header checksum etc. This complexity can be eliminated taking advantage of the extension IP header concept discussed under IP Routing. Here the user terminal inserts an extension L2-header or a label that contains the egress satellite information rather than extension IP header. The first L2 frame of a given IP packet contains the extension L2 header. In this framework, the satellite does not need to implement IP layer. When the RLC layer completes the re-assembly, it simply inspects the extension L2-header of the first frame to route to egress satellite. This leads to a reduced complexity satellite implementation.

Paragraphs above describe efficient methods for routing in constellation with the aim of reduced complexity at individual satellites. This entailed the two user terminals to inform each other when it executes a satellite handover. Depending on the delay in communication between the two user terminals, it is possible that some packets are in transit with the old egress satellite ID. These packets will not reach the destination user terminal since the user terminal has completed handover to a new satellite. This can result in packet losses during satellite handover. To mitigate this and achieve lossless handover, implementations herein may incorporate a packet data convergence protocol (PDCP) Lite function in the individual user terminals. PDCP-Lite function introduces a sequence number to individual IP packets. When the destination UT PDCP-Lite layer finds a missing PDCP during handover, it requests the originating PDCP-Lite function to retransmit PDCP.

Implementations described above provide efficient techniques to establish direct UT-UT connection via LEO-LEO or LEO-MEO links. As described, the packets originate in one user terminal and reaches the destination UT without traversing through a ground network. In some systems, it may be required to know the volume of data (not the actual data itself) transferred during the direct UT-UT connection. For example, billing may require a determination of the volume of data sent. Another reason may be for traffic engineering. In an indirect UT-UT connection, this volume is easily determined by the 5G Core Network elements since all packets pass through the 5G Core. In the direct UT-UT connection approach described above, packets may not pass through the 5G core network elements. Two methods are introduced herein to address this issue of measuring the volume of data in a direct UT-UT connection. In the first method, the ingress satellite may simply replicate IP packets (or altered IP packets) towards the ground (and hence 5G core network); but destroy the content of the IP packet so that it makes no sense to a listener on the ground infrastructure. The 5G core network would simply compute volume based on these modified IP packets. However, this method consumes resources on the satellite as well as bandwidth. In a second method, the ingress satellite does the volume accounting and simply sends one message to an accounting server on ground when a UT hands over to a different satellite. This method does require an application layer implementation in the satellite, but it does not consume as much satellite resources or spectrum.

Figure 14:
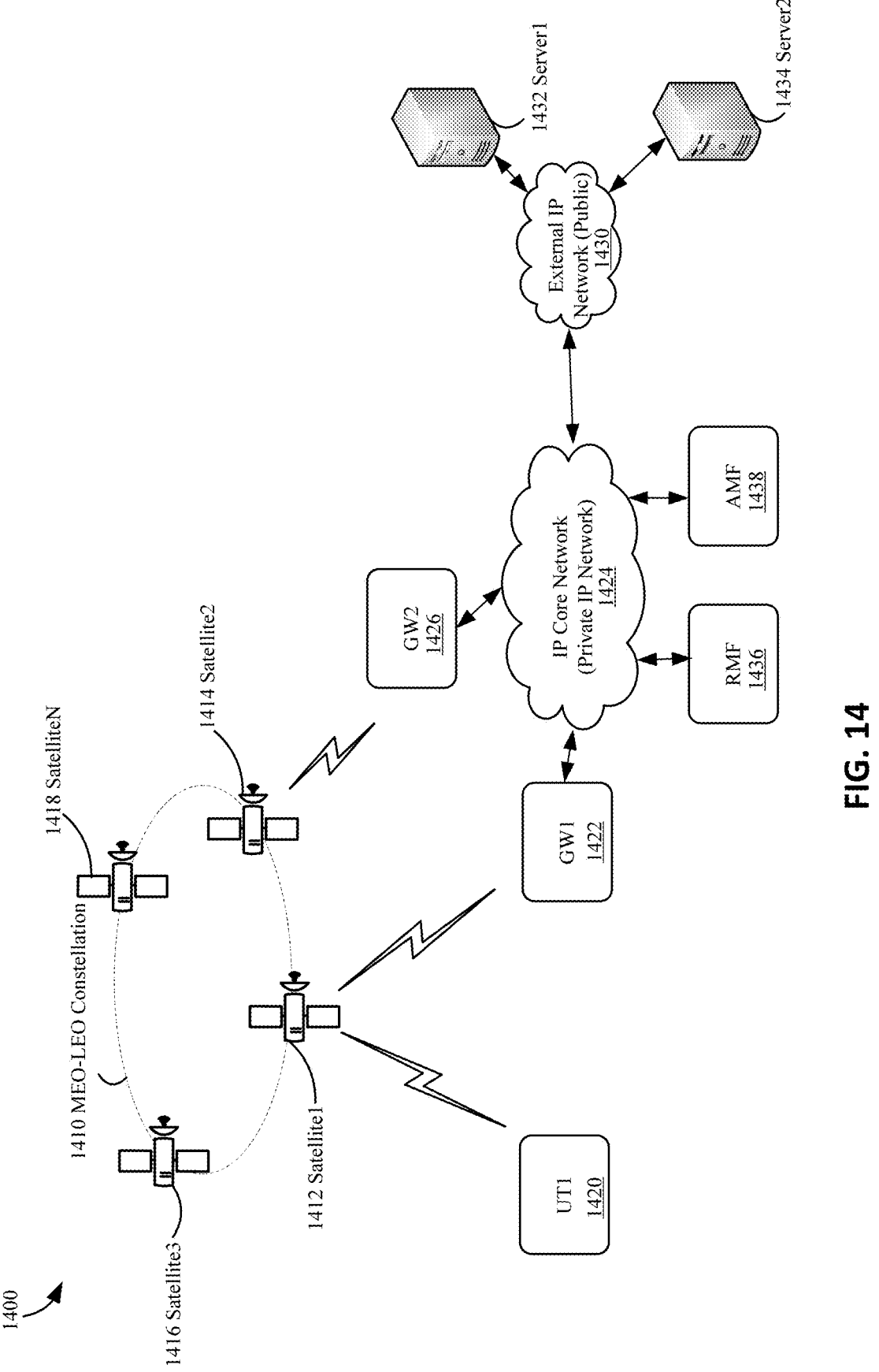
FIG. 14 is a diagram showing an example implementation of a satellite system 1400 with SDN orchestration.

FIG. 14 is a diagram showing an example implementation of a satellite system 1400 with SDN orchestration. The specific implementation shown in FIG. 14 is one possible implementation of the MEO-LEO system 100 shown in FIG. 1. The example implementation of the satellite system 1400 shown in FIG. 14 includes a satellite constellation 1410. The satellite constellation 1410 may combine an MEO constellation 110 and an LEO constellation 112 as shown in FIG. 1. The satellite constellation 1410 may include any number of LEO and MEO satellites. In the illustrated implementation, the satellites are represented by Satellite1 1412, Satellite2 1414, Satellite3 1416 and SatelliteN 1418, where SatelliteN represents any number of satellites may be included in the satellite constellation 1410. The satellite system 1400 further includes a number of user terminals (UT) that communicate with the satellites. A first user terminal, UT1 1420 is shown communicating with Satellite1 1412. UT1 may communicate with Satellite1 as described above over a single beam or multiple beams as described above.

The satellite system 1400 may include a number of satellite gateways that also communicate with the satellites. The satellite gateways may communicate with LEO and MEO satellites over one or more beams and one or more bands as described above. In the illustrated example, GW1 1422 communicates with the satellite 1412 and GW2 communicates with Satellite2 1414. The satellite gateways 1422, 1426 also communicate over an internet protocol (IP) core network 1424 which may be a private IP network. In this implementation, the IP core network 1424 includes a Route Management Function (RMF) 1436 and an Access and Mobility management Function (AMF) 1438. The RMF 1436 and the AMF 1438 are function modules that perform the functions and operations as described further herein. The RMF 1436 and AMF 1438 may include executable modules that reside on a computer or server such as servers 144 shown in FIG. 1 that implement a software defined network functionality as introduced above. Alternatively, the RMF 1436 and AMF 1438 functions may be located at another location such as on a satellite. However, placement of the RMF 1436 and the AMF 1438 on hardware of the IP core network 142 reduces computational requirements of the satellites by offloading these functions to a ground-based computer or server. The IP core network 1424 may also include a border gateway (not shown) for connecting to external IP networks 1430. In this implementation, the external IP network 1430 is a public network such as the Internet which may connect to remote servers Server1 1432 and Server2 1434. Server1 1432 and Server2 1434 represent data available over the Internet as know in the prior art.

Each satellite in the constellation is treated as a router in the overall network architecture. However, unlike traditional IP routers that determine a next-hop based on network ID portion of the destination IP address, the routing of data in the satellites is based on a satellite ID provided by user terminals and gateways in L2 frames transmitted to satellite. The RMF 1436 in combination with routing based on the network ID portion of the destination address allows for SDN orchestration of data routing. Routing data in the satellite network in this manner significantly saves the amount of memory needed in the satellite and reduces search complexity which reduces the load on satellite computing resources. A single satellite may have multiple gateway links. Each of the gateway links of a satellite is identified by a feederlink ID.

Figure 15:
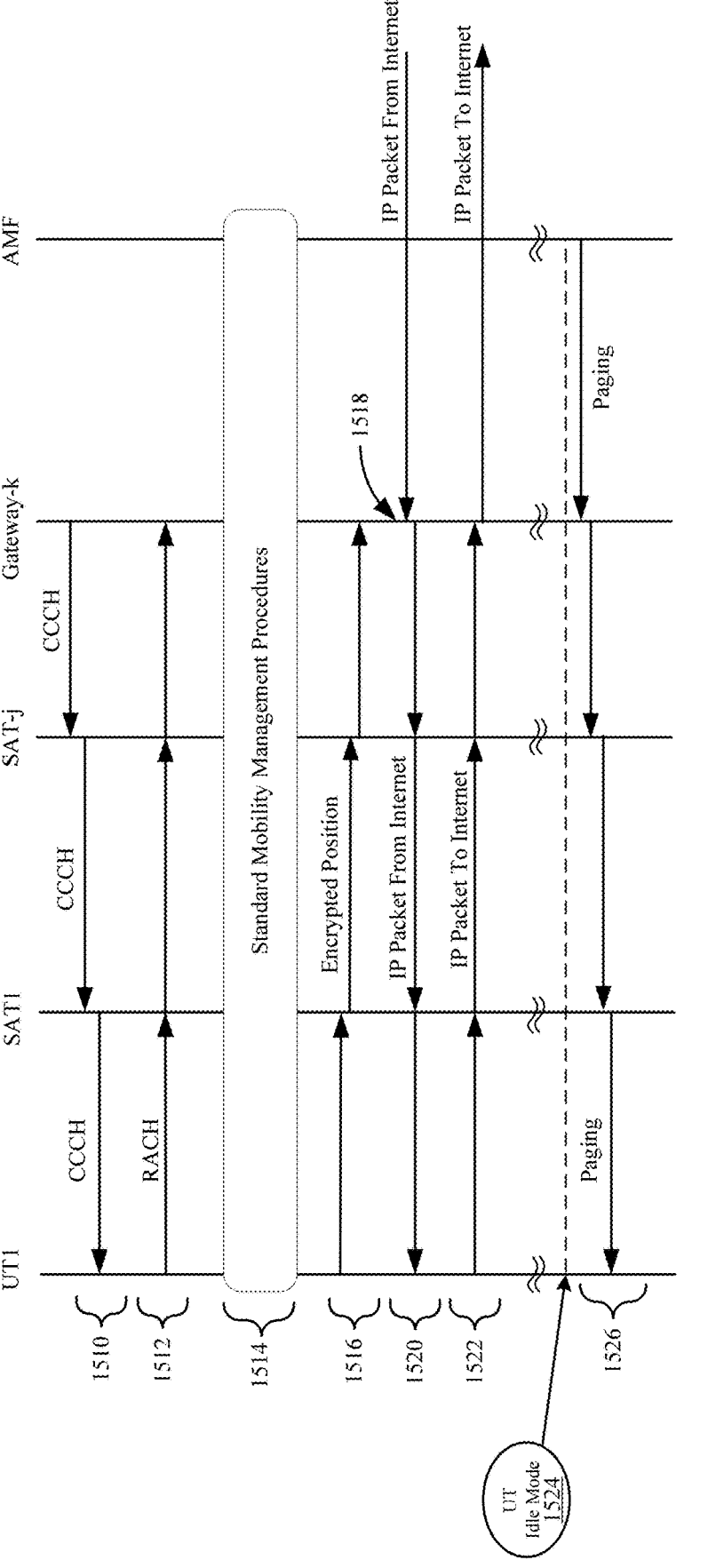
FIG. 15 illustrates an example of determining a satellite ID for placing in L2 headers to send data over a satellite system.

FIG. 15 illustrates an example of determining a satellite ID for placing in L2 headers to send data over the satellite system 1400. A given UT in idle mode determines the satellite ID to include in L2 headers based on listening to Common Control Channels (CCCH) from gateways. The CCCH is a control plane communication protocol know in the prior art. In implementations herein, additional information is added to the CCCH to enable the system to provide SDN orchestration of data routing. Gateways may transmit their own IDs, a feederlink ID as well as the ID of the satellite with which it is communicating in the CCCH 1510. User terminals in idle mode first listen to CCCH and determine the satellite ID through which gateway transmitted the CCCH. The UT then populates a Random Access Channel (RACH) signal with the gateway's ID (Gateway-K), feederlink ID and Sat-J ID and the satellite it is communicating with (Sat-1 in the example of FIG. 15) 1512. When this signal is received, Gateway-k then knows the satellite UT1 is communicating with (Sat-1) and UT1 knows how to reach Gateway-k via Sat-j. After exchanging IDs, standard mobility management procedures may be executed 1514 between UT1 and the AMF via Gateway-k. The standard mobility management procedures 1514 may include establishing a security association between UT1 and Gateway-k. Based on the above CCCH and RACH exchange, UT1 knows how to reach Gateway-k and Gateway-k knows how to reach the UT1. The UT1 may send an encrypted position to Gateway-k 1516. The Gateway-k may then store the position of the user terminal received from UT1. Subsequently, determinations of which satellite UT1 is communicating with will be under control of Gateway-k. Therefore, Gateway-k knows how to reach UT1 for all transmissions to UT1.

When the Gateway-k receives an IP packet from the internet via PD 1518, the gateway includes its own gateway ID, Satellite ID, and feederlink ID in the header of data frames transmitted to the UT 1520. The UT receives the IP packet and takes note of the gateway ID, satellite ID and feederlink ID to use in uplink transmissions to the gateway. In connected mode, the gateway determines the satellite ID to be used for user downlink based on the UT's position. Until the UT provides position information to the gateway, the gateway uses the satellite ID that is provided by user terminal in its header data. In connected mode, the UT determines the satellite ID to be used for uplink based on gateway and satellite ID transmitted by the gateway to UT1 1522. When a satellite receives a L2 frame from UT1 (call this satellite as ingress satellite for uplink) with a destination label pointing to a different satellite (call this as egress satellite), ingress satellite needs to determine the next hop to reach the intended egress satellite. In this example, Sat-1 receives data with the next hop being Sat-j as indicated by the header containing the ID of Sat-j. Using the above method of finding the next satellite hop eliminates the need for the ingress satellite to construct and update routing tables which is computationally very expensive since it requires knowledge of all links in constellation.

At various times, a UT may enter an idle mode where no data is being sent 1524. A packet of data from the internet may trigger paging at the AMF. In the idle mode, gateways may determine the satellites to which a UT is listening based on the UT's position 1526. Gateways may page via these satellites simultaneously or sequentially starting from the most likely satellite to least likely satellite until a successful response. Paging is a standard mobility management procedure.

Figure 16A:
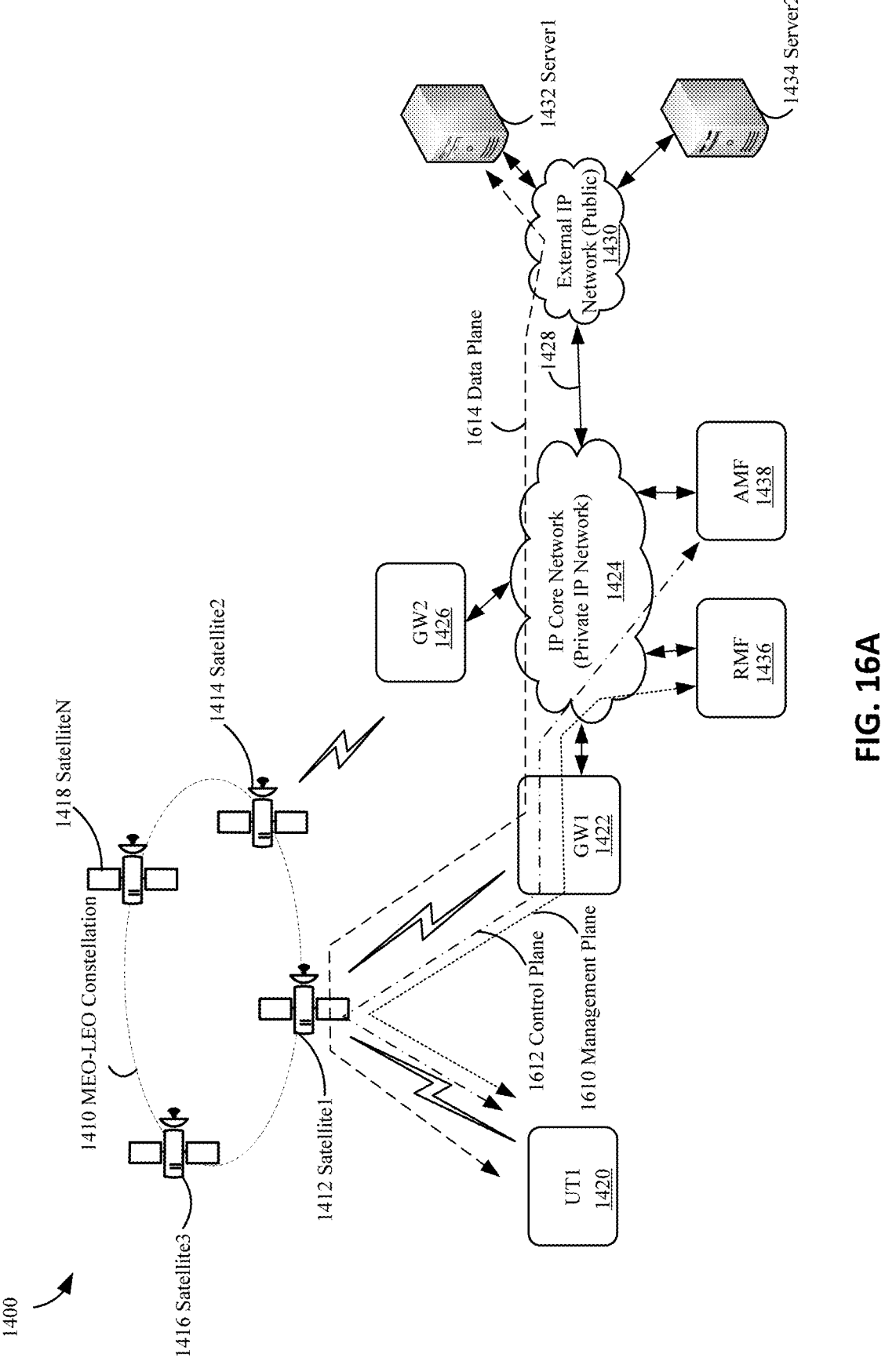
FIG. 16A illustrates an implementation of a management plane in a satellite system.

FIG. 16A illustrates an implementation of a management plane 1610 in a satellite system such as the satellite system 1400. The management plane 1610 functions between a user terminal UT1 1420 and the RMF 1436. In this example, the management plane 1610 passes from UT1 1420, through Satellite1 1412, the IP core network 1424 to the RMF 1436. The management plane 1610 allows the satellite system 1400 to efficiently manage the flow of data as described herein to reduce the memory and computing resources needed on the satellites. The management plane is supported by the RMF 1436 as described further below. The satellite system 1400 may also include a control plane 1612 and a data plane 1614. The control plane 1612 and data plane 1614 may be connected and function in a similar manner as in the prior art when communicating over a 5G core network. In this example implementation, the control plane 1612 connects the UT1 1420 with the AMF 1438 through Satellite1 1412 and GW1 1422. The data plane 1614 connects UT1 1420 with server1 1432 through Satellite1 1412, GW1 1422, IP core network 1424, and the external IP network 1430. A user terminal registers with the AMF first before obtaining an IP address and communicating with entities on the external IP network such as server1 1432. The management plane 1610 may also be provided between all the satellites and the RMF 1436, as well as between all the gateways and the RMF 1436 as described below.

Figure 16B:
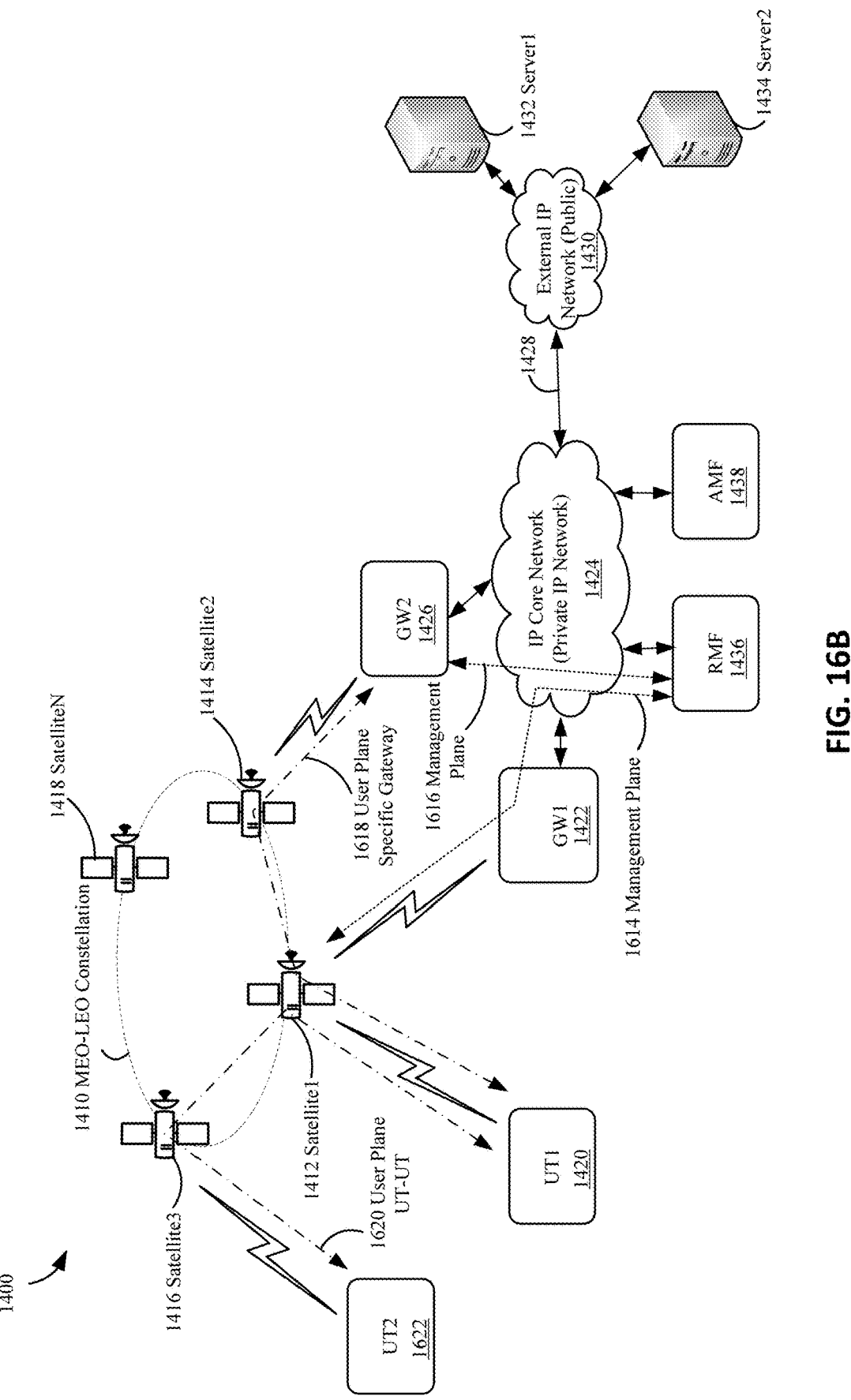
FIG. 16B illustrates additional management plane paths and data plane paths in a satellite system.

FIG. 16B illustrates additional management plane paths and data plane paths in a satellite system such as system 1400. The management plane 1610 may also be provided between all the satellites and the RMF 1436, as well as between all the gateways and the RMF 1436. In the illustrated implementation, an additional management plane path 1614 is shown from satellite1 1412 to the RMF 1436 through GW1 1422 and the IP core network 1424. Further, another management plane path 1616 is shown from FW2 1426 to the RMF 1436 through the IP core network 1424. These additional management paths allow the RMF 1436 to receive links and determine route updates as described below. FIG. 16B further illustrates additional data plane paths useful for specific circumstances. For example, in some scenarios it may be required or useful to have data flow for specific user terminals to land on gateways in a specific country or region. The need for placing the data on the ground in a specific location may be dictated by political, government or security reasons. Routing data to a specific gateway allows the system to provide users with data that meets these political, government or security needs. In the illustrated implementation shown in FIG. 16B, a user plane communication 1618 path for a specific gateway is supported between UT1 1420 and GW2 1426 by sending the data through satellite1, to satellite2, and then to GW2 1426.

FIG. 16B further illustrates an additional data plane paths that supports a direct UT to UT data connection. A direct UT to UT data plane path supports sending encrypted data directly from a first user terminal to the second user terminal with a private key to allows highly secure communication that does not touch or pass over ground networks as described above. In the illustrated implementation, a user plane UT-UT path 1620 is shown from UT1 1420 and UT2 1622 through satellite1 1412 and satellite3 1416. Satellite1 1412 and satellite3 1416 may be either MEO or LEO satellites that communicate over one or more satellite links as described above. The RMF 1436 supports the direct UT-UT path 1620 as described below.

Each satellite in the satellite system 1400 may have multiple links or input/output ports that allow them to communicate with user terminals, satellites in the same constellation (intra-constellation cross-links), satellites in other constellation (inter-constellation cross links), one or more gateways. For example, an LEO satellite may have links as shown in FIG. 4, and an MEO satellite may have links as shown in FIG. 7. A default routing table may be loaded to each satellite when they are initially placed into operation. This default routing table contains next-hop information for all satellites in the constellation. Each satellite may report the status of all the links (except user links) to RMF periodically as well as on an as-needed basis. This status information may include metrics such as link up/down, link congestion (such as queue occupancy), estimated delay to reach an adjacent node, error rate on the link, or other status information. The link information may be used by the RMF to provide the routing table information to the satellites as described herein to support the management plane communication.

Figure 17:
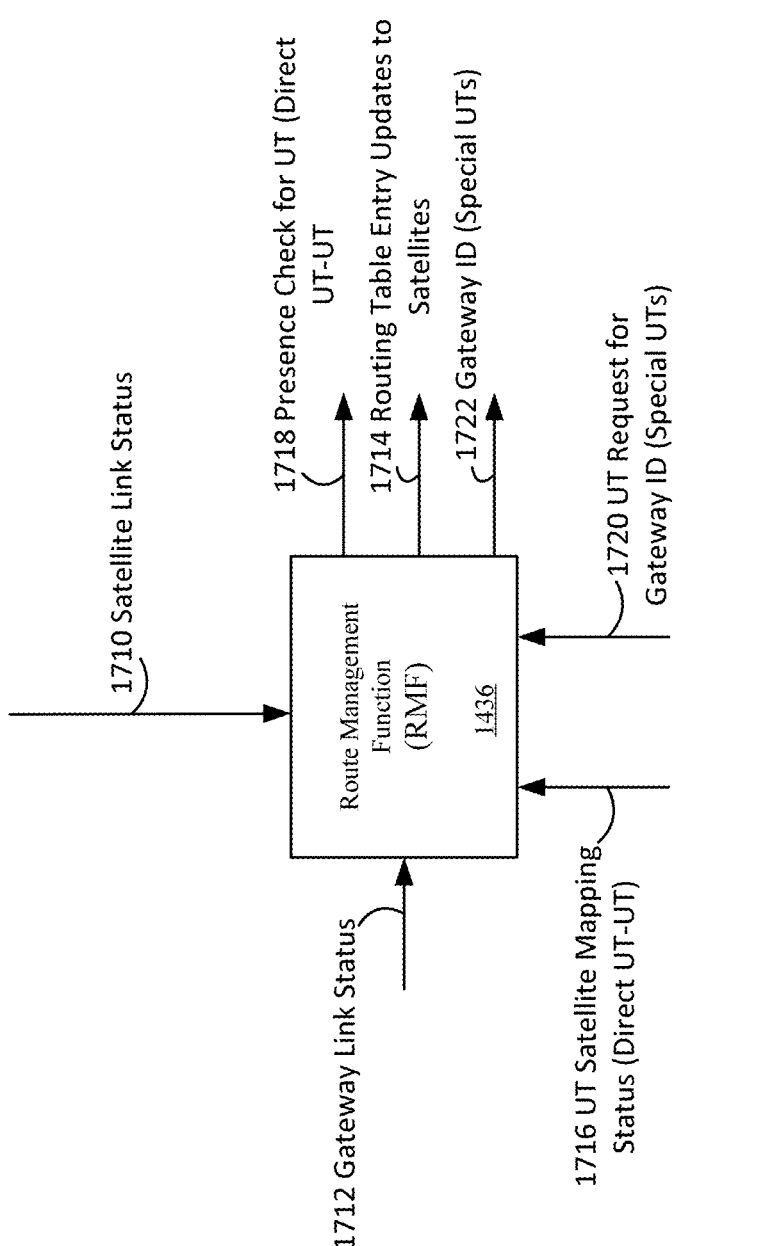
FIG. 17 illustrates details of the route management function.

FIG. 17 illustrates details of the RMF 1436. The RMF 1436 provides SDN orchestration for route management of data in the MEO-LEO satellites system 1400. The RMF 1436 has a satellite link status input 1710 to receive the state of links from all satellites (both MED and GEO) in constellation. The RMF 1436 also receives state of links from all gateways through the gateway link status input 1712. The RMF 1436 determines routing updates for tables in the satellites based on received information and then uploads routing table updates 1714 to satellites (if changed from previous table entry). The RMF also may receive satellite mapping status 1716 updates from user terminals that want to be part of Direct UT-UT session. The RMF 1436 may perform a presence check 1718 of user terminals that have not performed routing updates when they are requested to be in Direct UT-UT session. The RMF 1436 may also receive a UT request for gateway ID 1720 from special user terminal and provide a gateway ID 1722 to the special terminals as described further below. The satellite link status input 1710, gateway link status input 1712, satellite mapping status 1716 and the request for gateway ID 1720 are management plane signals that may be sent on an appropriate protocol such as TCP. Similarly, the outputs routing table updates 1714, presence check 1718, and gateway ID for special UTs 1722 are also management plane signal that may be sent using TCP or another appropriate protocol.

Figures 18A, 18B:
FIG. 18A illustrates an example of a routing table for flow independent routing.
FIG. 18B illustrates an example of a routing table for flow dependent routing.

Data can be routed based on the data flow using the uploaded routing tables. FIG. 18A illustrates an example of a routing table 1800 for flow independent routing. Based on link status received from multiple satellites and gateways, the RMF 1436 calculates next-hop for each satellite in the constellation. This determination may be accomplished using well known link state algorithms for determining the shortest path. Alternatively, for the optimal application performance and for purposes of load balancing, the RMF 1436 may also calculate multiple next-hops to reach the same satellite in the constellation that is flow dependent, where the next hop in the table depends on the type of data in the flow. The flow type of delay sensitive may include data such as real time communication or critical data updates. The flow type of insensitive may include streaming video or data backups. The flow type of data may be determined by looking at specific fields in data headers. For example, the flow type may be determined by a combination of flow label or Differentiated Service Code Point (DSCP) in IP packet headers, and/or port numbers in transport layer headers. In the example routing table shown in FIG. 18A, for example, the next hop for data to satellite ID=1 is East and the next hop for data to satellite ID=2 is MEO-1.

FIG. 18B illustrates an example of a routing table 1810 for flow dependent routing. For flow dependent routing, the routing table may have multiple rows for a given satellite ID. In this example implementation, the table 1810 has multiple rows for satellite ID=1. Each row provides a next hop for satellite ID=1 depending on the flow type. Data is forwarded through the MEO-LEO satellite system based on the routing tables as shown in FIG. 19.

Figure 19:
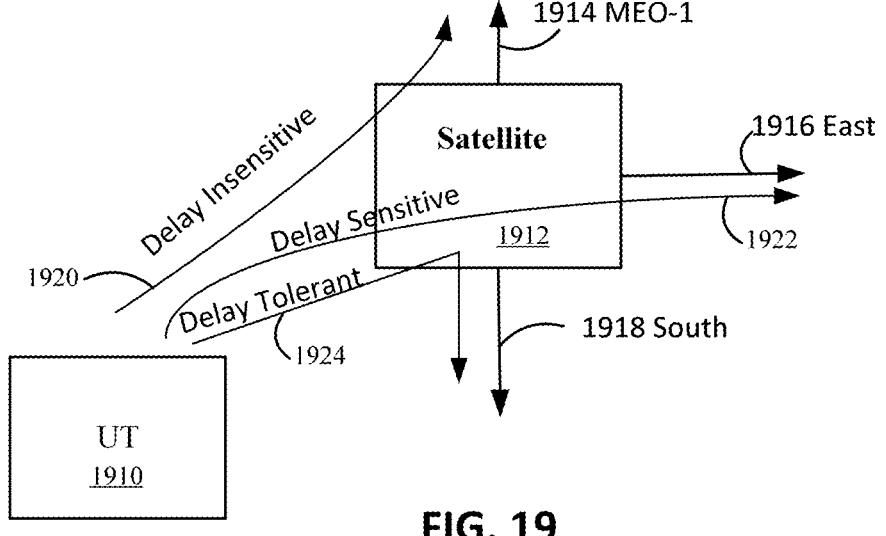
FIG. 19 illustrates an example of a forwarding function on a satellite for forwarding data based on a routing table.

FIG. 19 illustrates an example of a forwarding function on a satellite 1912 for forwarding data based on a routing table. Data is forwarded to the next hop based on the routing table shown in FIG. 18B. Here data from a user terminal 1910 is assumed to be bound for SAT1 when it reaches satellite 1912. Data that is delay sensitive 1922 is sent on the East link 1916 as indicated in the flow dependent routing table. Similarly, delay insensitive data 1920 is routed to the MEO-1 link 1914 and delay tolerant data (delay sensitive, use best effort) 1924 is routed to the south link 1918.

Once the entries of the routing table are determined, the RMF 1436 uploads updated routing table information to the relevant satellites, where each satellite may receive unique routing tables similar to the examples shown in FIGS. 18A and 18B. The RMF 1436 may upload only those entries that have changed from the previous upload to minimize management plane overhead. Each satellite may have a predefined IP address and the RMF 1436 may then populate an IP header carrying Flow Label or DiffServ Code Point (DSCP) to the individual satellites with appropriate priority levels to upload the routing tables. Updates that are a result of a link failure may be uploaded with Flow Label and DSCP which receives the highest priority communication treatment from the RMF 1436 to the satellite of interest.

Figure 20:
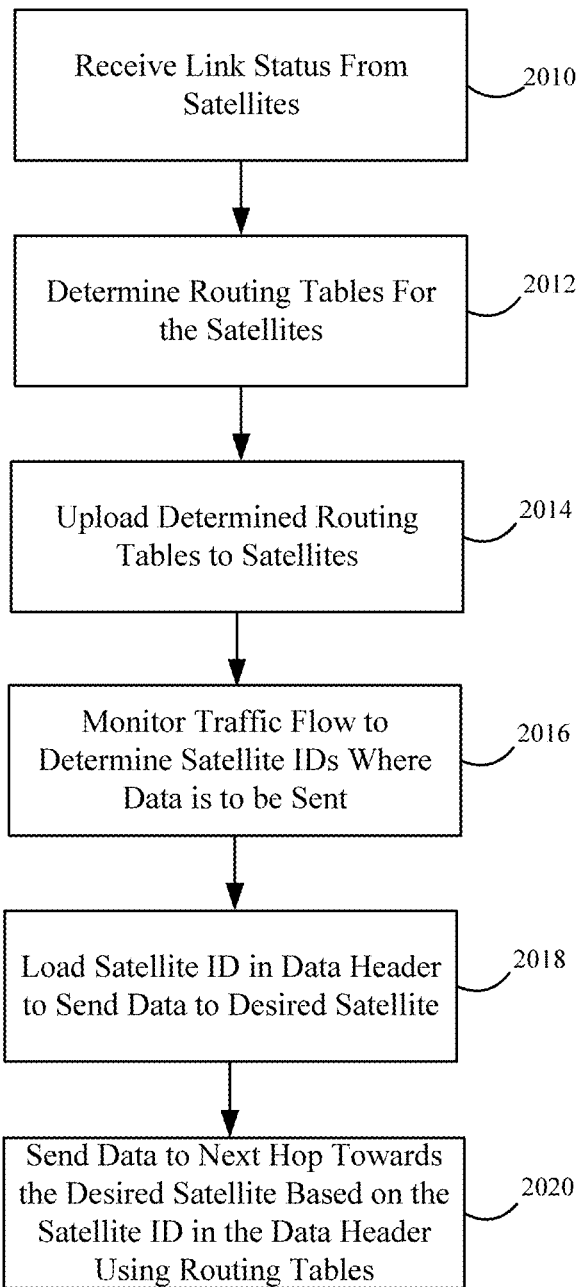
FIG. 20 illustrates a method for a satellite system with software defined network orchestration.

FIG. 20 illustrates a method for a satellite system with software defined network orchestration as described herein. The system first receives inputs from the satellites and gateways in the system (step 2010). The inputs may include satellite and gateway link status from the satellites and gateways, satellite mapping status for direct UT-UT communication and request for gateway ID for special UT as described above. The system may then determine routing tables for the satellite (step 2012). The routing tables may be determined by the RAF described above which may be located in a ground based server. The satellite tables may include next hop information for delay sensitive and delay insensitive flow types. The determined routing tables are then uploaded to the satellites (step 2014). Only updated routing tables, those containing new information, may be uploaded. Each satellite then monitors data traffic flow to determine satellite IDs where the data is to be sent (step 2016). The UTs may then load satellite IDs in a data header to send data to a desired satellite as described above (2018). Then, send data to a next hop towards the desired destination satellite based on the satellite ID in the data header using the routing tables (step 2020). Data can be sent to a different next hop depending on the flow type of data as described above and shown in FIG. 19.

Figure 21:
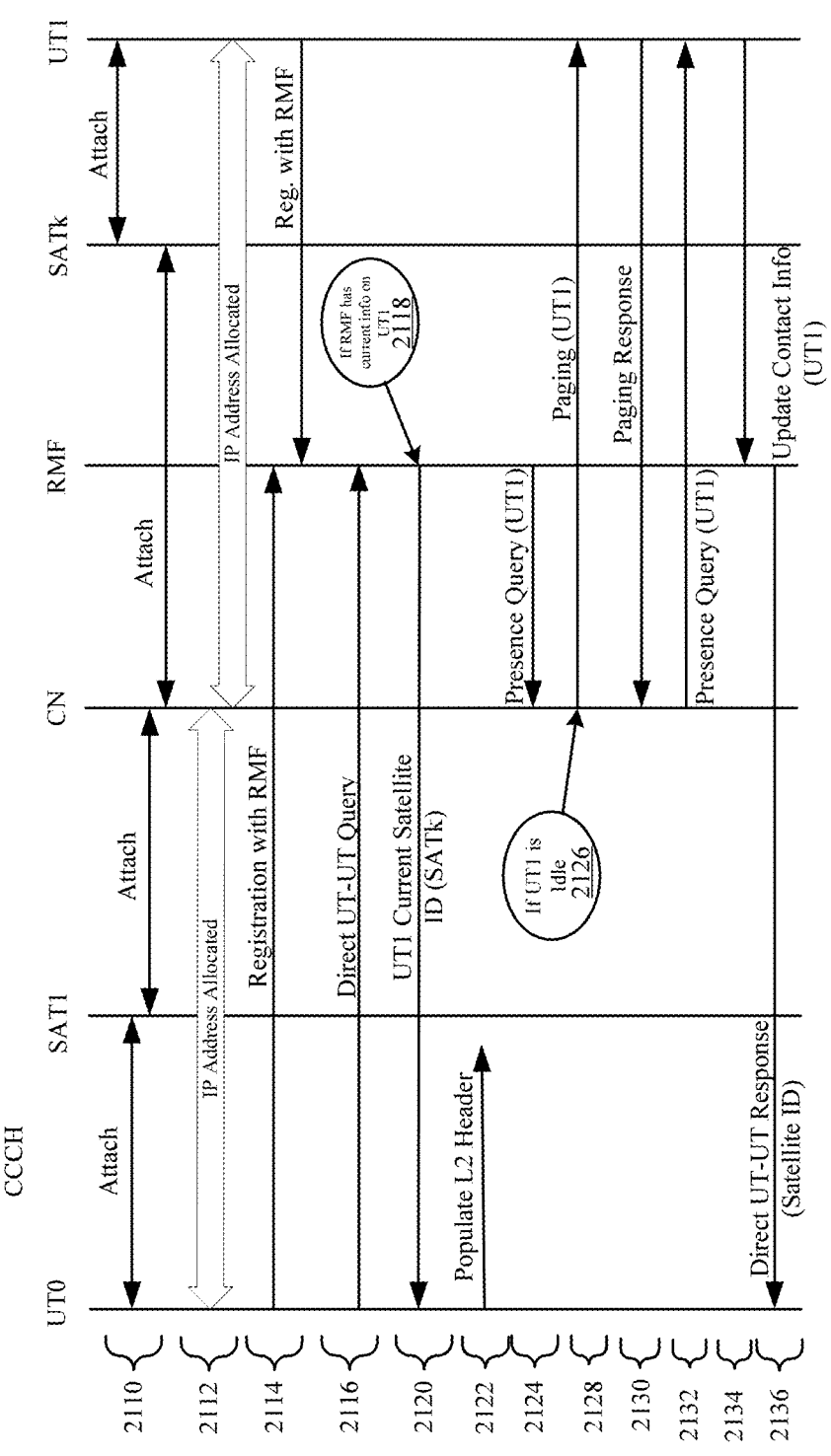
FIG. 21 illustrates an example of the RMF managing a direct UT-UT session over a satellite system.

FIG. 21 illustrates an example of the RMF managing a direct UT-UT session over a satellite system. Each UT (UT0, UT1) first attaches with the core network (CN) 2110 and obtains its own IP address 2112. Upon successful completion of the attach procedure, the user terminals register with RMF 2114. A UT that wants to be in a direct UT-UT communication (the originating terminal) provides details such as the satellite ID it is communicating with, whether it is capable of communicating with only LEO, only MEO or both LEO and MEO. The UT is also obligated to update this information every time there is a satellite handover in connected mode. When the originating UT (UT0) wants to establish direct communication with a destination UT (UT1), the originating UT first queries the RMF 2116. If RMF has up-to-date information about the satellite ID with which the destination UT is communicating 2118, then RMF conveys 2120 that satellite ID information to the originating UT. Upon receipt, the originating UT (UT0) populates L2 header with destination label that includes the satellite ID with which destination is communicating 2122.

When destination/originating UT executes a satellite handover during a Direct connection, the handover information is conveyed to the other party via an RRC-UU message as described above. If RMF does not have up-to-date information about the destination UT, RMF transmits an application layer message to UT requesting Presence information 2124. If the destination UT has entered idle mode 2126, then the core network will page this UT 2128. Once the paging response is received successfully by the core network 2130, UPF in core network will forward the application layer message to destination user terminal (UT1) 2132. (The messages to and from the RMF (Presence Query, Update Contact Information) are application layer messages.) Destination UT responds to the Presence query from RMF to update the RMF about the satellite with which it is communicating with 2134. Upon receiving the response from destination UT, RMF responds to originating UT about the satellite ID with which destination UT is communicating 2136 for the direct UT-UT communication. If no response is received by RMF from destination UT for the Presence query, RMF responds to the originating UT that the destination is unreachable (not shown).

As described above, a user terminal determines the gateway with which it wants to communicate based on listening to transmissions from the gateway. However, there are scenarios where special user terminals require packets belonging to certain flows to only be routed via specific gateways. To facilitate this flow-specific routing, these special user terminals first register with RMF function indicating their preferred gateway or set of gateways. For example, it could be any gateway within a given country. When these special UTs invoke flow-specific routing, they query the RMF first. RMF determines the best path from the special UT to one of the preferred gateways. This best path is determined based on the status of the gateway links provided by the preferred gateways as well as the loading of different links in the constellation. RMF provides to the UT the above-determined gateway link ID and satellite ID with which the chosen gateway is communicating with. Once the UT receives the satellite ID for the preferred gateway, UT populates the L2 header with a destination label pointing to the egress satellite ID.

As described above with reference to FIG. 1, the MEO-LEO system 100 includes a number of UT that communicate with the MEO satellites 114 and the LEO satellites 118. In the example shown in FIG. 1, the LEO user terminal 134 operates in Ku band and MEO user terminal 124 operates in the Ka band. A given terminal may also have multi-band, multi-orbit capability that can operate at Ku and Ka band to communicate with the LEO and MEO satellites as shown in FIG. 1 and described above. Users of these multi-band user terminals can enjoy a much better Quality of Experience (QoE) since it is possible to route delay sensitive traffic via the low latency LEO satellite and delay insensitive traffic via MEO satellite. The LEO satellite gateways 138 support Ka, V and Q band frequencies on the feeder link 140 so that many spot-beams can be supported in the user link. The MEO gateway 150 supports Ka, V, Q and E band frequencies on feeder link 152 so that many spot-beams can be supported in the user link. As used herein, the Ka, Ku, V and Q are frequency bands commonly used in communication links of communication systems such as satellite communication systems.

The MEO satellites' user links operate in the Ka band and the MEO gateway links in the Ka, V/Q and E bands. The overlap of common transmission bands leads to the possibility for interference. The disclosure is directed to interference mitigation techniques for the overlaps in transmission bands in a satellite communication system, particularly a satellite system with multiple constellations. As described herein, the LEO gateway links can switch to V/Q band, as necessary to assist in resolving in-line events between Ka Gateway links for LEO satellites and Ka user links for MEO satellites. Likewise, the MEO satellites can utilize E-band when needed due to in-line events or capacity needs. Other mitigation techniques for in-line events between a LEO Gateway link that use Ka and MEO user link (that also uses Ka) include switching to a different gateway for the LEO satellite such that there is not an in-line event. User traffic can be routed on board each satellite utilizing SDN network capability. The entire network can be managed by a ground network which may include a Satellite Operations Center (SOC), a Network Operation Center (NOC), a Software Defined Network (SDN) and Operational Support Systems (OSS).

The use of phased array antennas in user links allows the flexibility of servicing small hot-spots with very high capacity density or larger spots to provide good average capacity density depending on the demand. User beams can be steered to provide earth-fixed coverage at a given location. Steering can be accomplished by updating the beam-forming coefficients constantly up to a threshold satellite steering angle or equivalent user terminal elevation angle or until a better satellite is available for coverage. Handoffs are handled seamlessly in the system such that the end-user is unaware of such events. In addition to beam, satellite and gateway handovers, the system will also support frequency handovers to mitigate interference and obey spectrum constraints. Here, a beam can be re-assigned a new frequency plan based on resource plans generated by NOC for different satellites covering different geographical regions. A given downlink beam can deliver more than 1 Gbps, depending on spectrum availability and user terminal G/T. The minimum user downlink channelization is 50 MHz. Multiple 50 MHz channels can be aggregated into wider channels up to 500 MHz in bandwidth. A given user beam can operate in one or both polarizations to provide maximum flexibility and serve capacity based on demand.

Figure 22:
FIG. 22 illustrates a view of satellite system with negligible interference between the LEO constellation and MEO constellation at the Ka band.

FIG. 22 illustrates a view of satellite system 2200 with negligible interference between the LEO constellation and MEO constellation at the Ka band. The satellite system 2200 is a multi-constellation satellite system such as satellite system 100 shown in FIG. 1. Satellite system 2200 has been simplified compared to FIG. 1 to illustrate potential interference between the LEO and MEO constellations. The satellite system 2200 includes a number of LEO and MEO satellites. In the illustrated example, a first LEO satellite1 2210A communicates with a second LEO satellite2 2210B with an intersatellite link 2212 (the LEO satellites are collectively referred to as LEO satellites 2210). The satellite system 2200 further includes an MEO constellation of satellites represented by MEO satellite 2214. The satellites communicate with a number of satellite gateways. The LEO satellites 2210 may communicate with LEO gateways 2216A, 2216B (collectively gateways 2216) over one or more beams and one or more bands. In the illustrated examples, the LEO satellites 2210 communicate with the LEO gateways 2216 over a combination of Ka and Q/V bands. The LEO gateways 2216 communicate with IP core networks 2218, which are connected to servers as described above with reference to FIG. 1. The satellite system 2200 further includes a number of user terminals (UTs) that communicate with the MEO satellites 2214 and the LEO satellites 2210. A first UT 2222 communicates over a single beam, on a single Ka band, with the MEO satellite 2214. A second UT 2224 communicates with the LEO satellites 2210 on the Ku band.

In a multi-constellation satellite system that uses the same frequency band for communication between gateways and user terminal, the potential for interference arises when the satellites are in a position where antennal lobes in the same frequency band may overlap at a user terminal or gateway. In the example shown in FIG. 22, the UT 2224 is operating at Ku band, the LEO gateway 2216 is operating in Ka, V and Q bands, and MEO UT 2222 is operating in Ka band. For the location of LEO and MEO satellites shown in FIG. 22, interference 2226 between MEO and LEO satellites at Ka band is low or negligible. The interference is low because the signal vector between LEO satellite 2210B and the LEO gateway 2216 is such that there is sufficient antenna discrimination in the Ka band at the UT 2222. Therefore, the full Ka and V/Q spectrum is available for LEO Gateway to use in feeder link to the LEO satellite2 2210B. FIG. 22 thus illustrates a view of satellite system 2200 with negligible interference between the LEO constellation and MEO constellation at the Ka band for the given relative positions of the satellites and gateways at a given point in time. Although the examples described herein show interference mitigation between an LEO constellation and an MEO constellation, the same concepts can be applied to any two satellite systems, for example one LEO to another LEO, an MEO to LEO, an MEO to MEO, etc.

FIG. 22 further illustrates data flow in the satellite system 2200 where there is low or negligible interference. In the scenario shown in FIG. 22, a UT 2224 communicates with satellite2 2210B. Satellite2 2210B then communicates with the LEO gateway2 2216B, which communicates with land-based servers over the IP core networks 2218. The land-based servers include the entities and servers shown in FIG. 23 and described below. When the satellite system 2200 determines there is low or negligible interference and no mitigation is necessary, the data can flow in the shortest route using the typical carrier band for the gateway. In the illustrated example shown in FIG. 22, the curved dotted line 2228 represents communication data path from the IP core networks to the UT 2224 when there is low or negligible interference. When the satellite system determines there is greater interference, the system may use interference mitigation as described further below.

Figure 23:
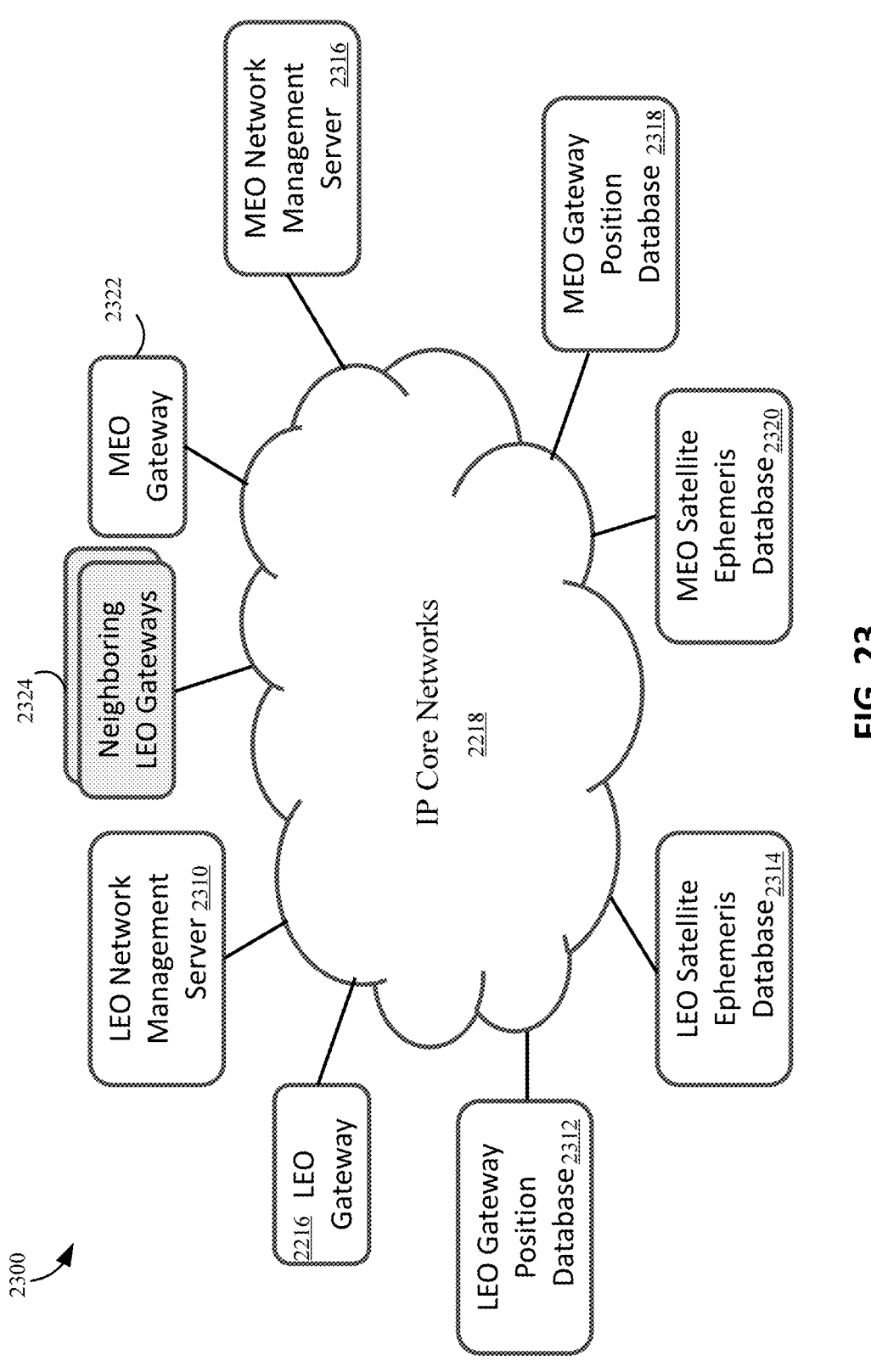
FIG. 23 illustrates management servers and systems connected over the IP core networks that support interference mitigation in a satellite system as described herein.

FIG. 23 illustrates management servers 2300 and gateways connected over the IP core networks 2218 that support interference mitigation in a satellite system as described herein. The management servers may be included as part of the servers 144 and SDN controller 152 described above with reference to FIG. 1. In the illustrate example, the management servers 2300 include an LEO network management server 2310, an LEO Gateway position database 2312 and an LEO satellite ephemeris database 2314. The management and application servers 2300 further include an MEO network management server 2316, an MEO Gateway position database 2318 and an MEO satellite ephemeris database 2320. Other entities that support interference mitigation include the LEO gateway 2216 and an MEO gateway 2322 as described above. Other neighboring LEO gateways 2324 represent gateways near the LEO gateway 2216 that may be accessed to determine a path for mitigation as described below. The LEO network management server 2310 and the MEO network management server 2316 are responsible for determining when an in-line event occurs. The determination of when an in-line event occurs is based on the positions of the LEO and MEO satellites from the LEO Gateway position database 2312, and the MEO Gateway position database 2318, and the shape of the satellite ephemeris stored in the LEO satellite ephemeris database 2314 and the MEO satellite ephemeris database 2320. This data may be retrieved by the LEO network management server 2310 and the MEO network management server 2316 through data requests over the IP core networks. When an in-line event occurs, the LEO and MEO management servers 2310, 2316 attempt to mitigate the interference as described below.

Figure 24A:
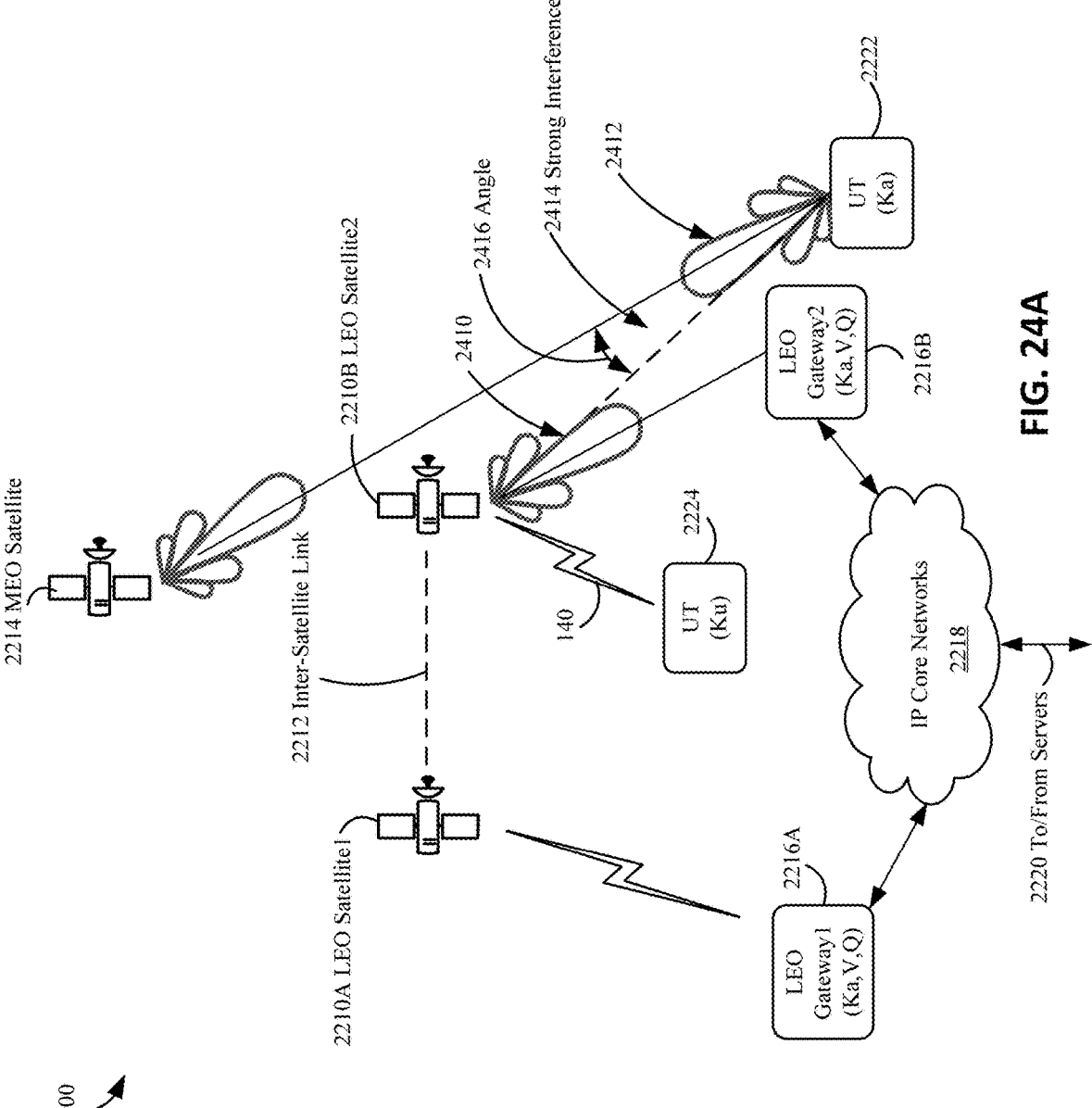
FIG. 24A illustrates an example of interference mitigation in a satellite system with significant interference between the LEO constellation and MEO constellation at the Ka band.

FIG. 24A illustrates an example of interference mitigation in a satellite system 2200 with significant or strong interference between the LEO constellation and MEO constellation at the Ka band. FIG. 24A illustrates the same system 2200 as introduced in FIG. 22 but at a different moment in time resulting in a different relative position of the satellites and gateways. The satellite system 2200 shown in FIG. 24A uses resource diversion to mitigate significant interference between the LEO constellation and the MEO constellation. The components in the satellite system 2200 are in a different physical relationship due to movement of the satellites or representing a different physical location of the user terminals and gateways. With the relative position of the satellites, gateways and user terminals as shown in FIG. 24A, the MEO satellite 2214 is in a position such that it results in an in-line event with LEO satellite communication.

In the example shown in FIG. 24A, the in-line event results from the main lobes 2410 of LEO satellite2 2210B and the main lobes 2412 of the MEO UT 2222 intersect sufficiently to cause strong interference 2414 on a common frequency band, such as the Ka band. An in-line event in general may occur when an angle 2416 between a line connecting a UT on the ground and an LEO satellite and a line connecting that same UT and an MEO satellite is less than a threshold, for example less than about 7 degrees. This strong interference 2414 between the LEO and MEO systems may cause a significant impairment in communication in either the LEO, the MEO or both systems. For example, an impairment of 1 dB in SINR (Signal to Interference and Noise Ratio) is considered a significant impairment threshold. In response, actions can be taken to mitigate this interference using one or more of the techniques described herein. It can be noted in FIG. 24A that the UT must be very close in physical proximity to the LEO gateway2 2216 for interference to occur. The physical locations of the gateways, current location of LEO satellites and current location of MEO satellites are used for in-line event determination at any given instant of time.

When interference scenario is detected or anticipated, the interference can be mitigated with one or a combination of the following: resource consolidation with other bands on same link that creates an in-line event, resource diversion to the same or other band on an alternate link which does not create an in-line event, and adaptive beam nulling that suppresses beam response in the direction of interference vector. Each of these mitigation techniques is described further below. Although the examples described herein show interference mitigation between LEO and MEO constellations, the same mitigation techniques are applicable to any two constellations as long as the ephemeris of satellites of these constellations are known to the system operators. Also, the described examples show interference mitigation provided for a Ka band interference scenario. As will be understood by one of ordinary skill in the art, these same principles apply for other bands of operation as well.

Figure 24B:
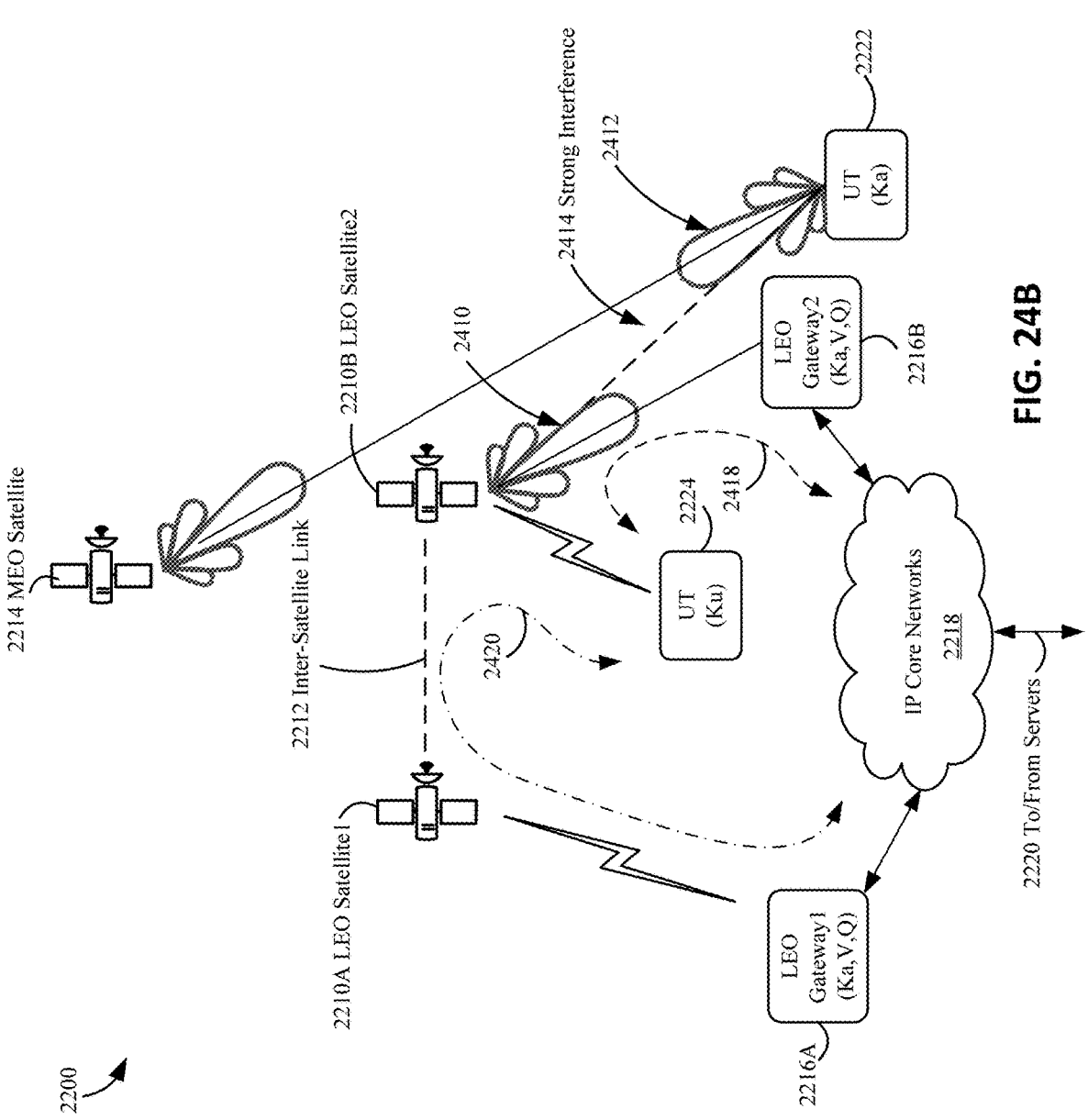
FIG. 24B illustrates an example of a satellite system using resource consolidation and resource diversion to mitigate significant interference between the LEO constellation and the MEO constellation.

FIG. 24B illustrates an example of a satellite system 2200 using resource consolidation and resource diversion to mitigate significant interference between the LEO constellation and the MEO constellation. The ephemeris of the satellites in the LEO and MEO constellations can be predicted and the gateway location on the ground are known and fixed. With this information, the in-line interference events can be accurately predicted. For resource consolidation mitigation, when an in-line interference event is predicted for the Ka band, traffic that would be carried on the Ka feeder link to/from an LEO Gateway is switched to be carried on V/Q bands when the V/Q bands have unused bandwidth available. For the example shown in FIG. 24B, data from UT 2224 is typically routed on the Ka band from the LEO satellite2 2210B to the LEO gateway 2216. When an in-line event is detected or predicted, the LEO satellite2 2210B determines if there is available bandwidth on the V and Q bands. If there is available bandwidth, data is rerouted to the V and/or Q bands to mitigate interference on the Ka band. The route of the data is shown at dotted line 2418.

FIG. 24B also illustrates a view of a satellite system 2200 using resource diversion to mitigate significant interference between the LEO constellation and the MEO constellation. For resource diversion mitigation, when an in-line interference event is predicted for the Ka band, traffic that would be carried on the Ka feeder link to/from an LEO gateway is routed through an alternate LEO gateway that has feeder link availability. This is possible since any satellite can communicate via any gateway through inter-satellite links (ISL). For the example shown in FIG. 24B, data from UT 2224 is typically routed on the Ka band from the LEO satellite2 2210B to the LEO gateway2 2216B. When an in-line event is detected or predicted, the system determines if there is an alternate gateway available through an inter-satellite link 2212. In this example, there is available bandwidth in LEO satellite1 2210A, and data is rerouted over the intersatellite link 2212 to LEO satellite1 2210A, and then routed to LEO gateway 2216A, thereby mitigating interference on the Ka band. The new route of the data is shown at dotted line 2420.

Figure 24C:
FIG. 24C illustrates a view of the satellite system shown in FIG. 24B using adaptive beam nulling to mitigate moderate interference between the LEO constellation and the MEO constellation.

FIG. 24C illustrates a view of a satellite system 2200 using adaptive beam nulling to mitigate moderate interference between the LEO constellation and the MEO constellation. There are scenarios where the geometry of satellites, user terminals and gateways are such that there is no direct in-line event of the main lobes, but still there is non-negligible interference between the constellations. In the example shown in FIG. 24C, a sidelobe 2424 of a transmitter on the satellite 2210B is in line with a sidelobe 2426 of the UT 2222. The sidelobes lined up in this manner may be sufficient to degrade communication to the UT 2222 in the Ka band. In such a case, it is possible to suppress the sidelobe response of transmit and/or receive antenna via the use of adaptive nulling. Where satellite and user terminal antennas are constructed using phased arrays, the weighting coefficients used in beam forming can be such that it is possible to suppress the response. It has been shown that the sidelobe response of a phased array antenna in the direction of interference can be suppressed by as much as 18.8 dB. Using adaptive beam nulling in this manner, the same band communication resource may be used without needing consolidation or diversion mitigation described above in situations of moderate interference 2422 such as shown in FIG. 24C.

Figure 25:
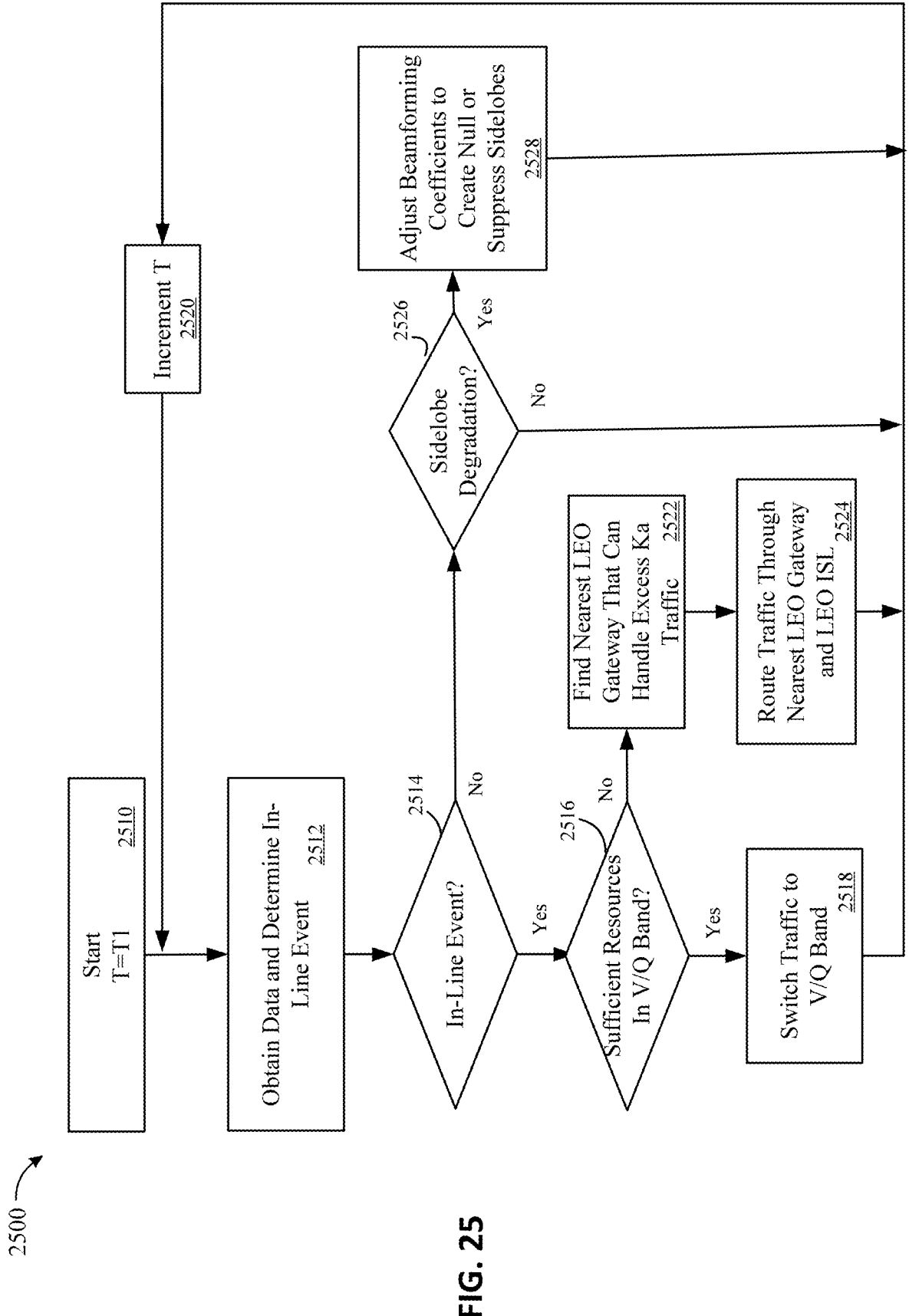
FIG. 25 illustrates a method for interference mitigation in a satellite system as described herein.

FIG. 25 illustrates a method for interference mitigation in a satellite system as described herein. The steps in this method may be performed by the LEO management server and the MEO management server described above with reference to FIG. 23. Other entities in the satellite system 220 may also perform steps of this method. The system starts with a first time T=T1 (step 2510). The system then obtains data from the various entities and determines whether there is an in-line event for the current T (step 2512). The determination of when an in-line event occurs is based on the positions of the LEO and MEO satellites from the LEO Gateway position database 2312, the MEO Gateway position database 2318, and the shape of the satellite ephemeris stored in the LEO and MEO satellite ephemeris databases as described above. When an in-line event is determined to be imminent or in process (step 2514=yes) then the method determines whether there are sufficient resources on V and/or Q band to communicate with the user terminal (step 2516). If there are sufficient resources on the V or Q band (step 2516=yes) then the system switches to routing traffic to the V or Q band (step 2518). Routing of communication data on the V or Q band can be performed as described above. The method then increments T (step 2520) to check for an in-line event at a next time interval. The time increment may be a selected interval of time such as every few seconds or other suitable time. The method then returns to step 2512 to repeat the method with the new time T.

Referring again to FIG. 25, if there are not sufficient resources on the V or Q band (step 2516=no) then the system finds the nearest LEO gateway that can handle the excess Ka band traffic (step 2522). The method can find the nearest LEO gateway with available resources by consulting the nearby gateways for available bandwidth to handle the excess Ka traffic as described above. The excess Ka traffic is the routed through the nearest available LEO gateway using the LEO inter-satellite link as described herein (step 2524). The method then continues with step 2520. When there is no in-line event determined to be imminent or in process (step 2514=no) then the method determines if the sidelobes cause noticeable degradation of transmit or receive signals of the Ka band (step 2526). If the sidelobes cause no noticeable degradation of transmit or receive signals of the Ka band (step 2526=no), then the method goes to step 2520. If the sidelobes cause noticeable degradation of transmit or receive signals of the Ka band (step 2526=yes), then the method adjusts the beamforming coefficients to create null or suppress sidelobes in the antenna (step 2528), the method then proceeds to step 2520 to repeat the process during the next time epoch.

The detailed examples of systems, devices, and techniques described in connection with FIGS. 1-25 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-25 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 26:
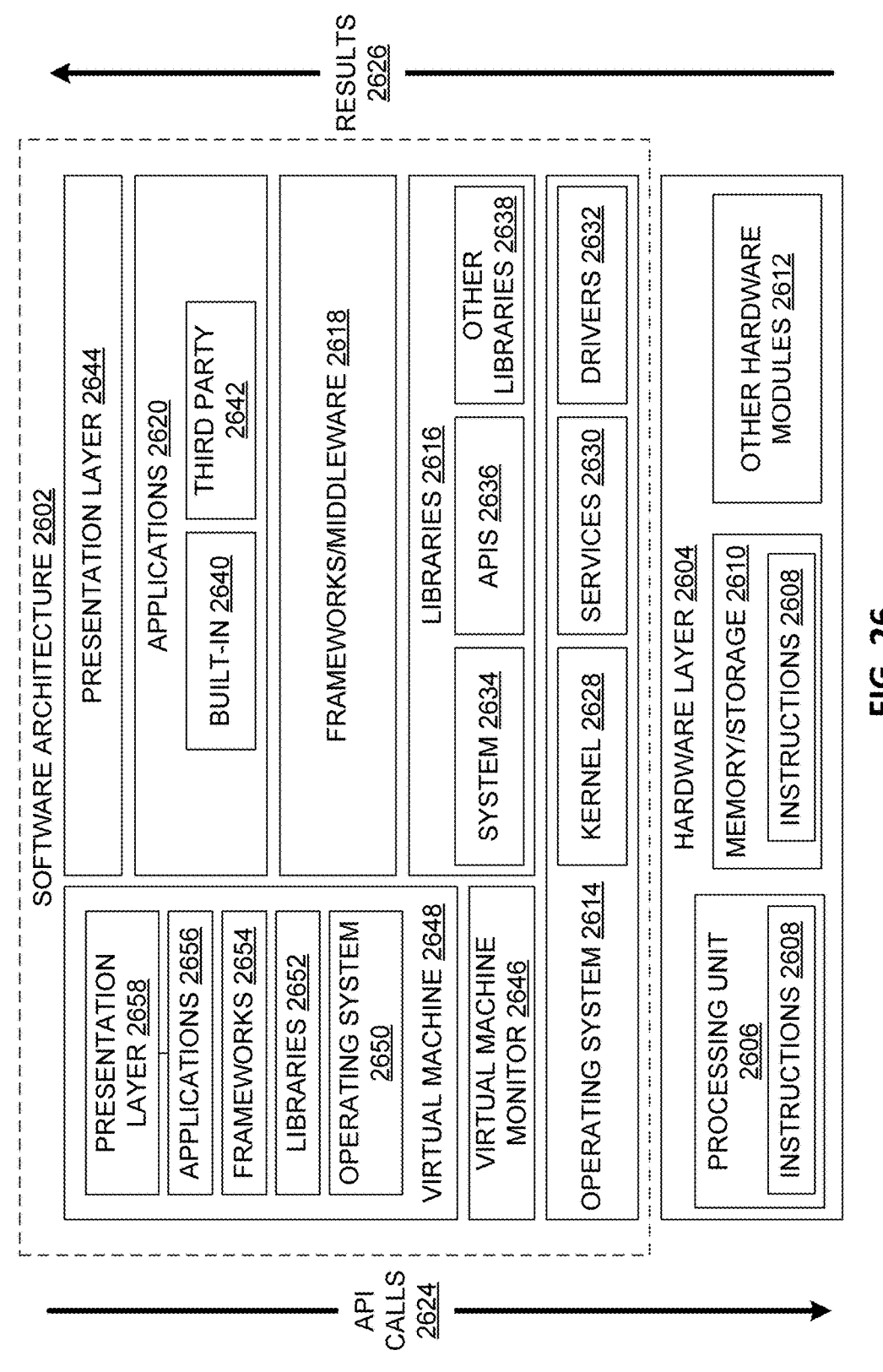
FIG. 26 is a block diagram showing an example software architecture, various portions of which may be used in conjunction with various hardware architectures herein described, which may implement any of the features described herein.

FIG. 26 is a block diagram 2600 illustrating an example software architecture 2602, various portions of which may be used in conjunction with various hardware architectures herein described, which may implement any of the above-described features. FIG. 26 is a non-limiting example of a software architecture, and it will be appreciated that many other architectures may be implemented to facilitate the functionality described herein. The software architecture 2602 may execute on hardware such as a machine 2700 of FIG. 27 that includes, among other things, processors 2710, memory 2730, and input/output (I/O) components 2750. A representative hardware layer 2604 is illustrated and can represent, for example, the machine 2700 of FIG. 27. The representative hardware layer 2604 includes a processing unit 2606 and associated executable instructions 2608. The executable instructions 2608 represent executable instructions of the software architecture 2602, including implementation of the methods, modules and so forth described herein. The hardware layer 2604 also includes a memory/storage 2610, which also includes the executable instructions 2608 and accompanying data. The hardware layer 2604 may also include other hardware modules 2612. Instructions 2608 held by processing unit 2606 may be portions of instructions 2608 held by the memory/storage 2610.

The example software architecture 2602 may be conceptualized as layers, each providing various functionality. For example, the software architecture 2602 may include layers and components such as an operating system (OS) 2614, libraries 2616, frameworks 2618, applications 2620, and a presentation layer 2644. Operationally, the applications 2620 and/or other components within the layers may invoke API calls 2624 to other layers and receive corresponding results 2626. The layers illustrated are representative in nature and other software architectures may include additional or different layers. For example, some mobile or special purpose operating systems may not provide the frameworks/middleware 2618.

The OS 2614 may manage hardware resources and provide common services. The OS 2614 may include, for example, a kernel 2628, services 2630, and drivers 2632. The kernel 2628 may act as an abstraction layer between the hardware layer 2604 and other software layers. For example, the kernel 2628 may be responsible for memory management, processor management (for example, scheduling), component management, networking, security settings, and so on. The services 2630 may provide other common services for the other software layers. The drivers 2632 may be responsible for controlling or interfacing with the underlying hardware layer 2604. For instance, the drivers 2632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2616 may provide a common infrastructure that may be used by the applications 2620 and/or other components and/or layers. The libraries 2616 typically provide functionality for use by other software modules to perform tasks, rather than rather than interacting directly with the OS 2614. The libraries 2616 may include system libraries 2634 (for example, C standard library) that may provide functions such as memory allocation, string manipulation, file operations. In addition, the libraries 2616 may include API libraries 2636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2616 may also include a wide variety of other libraries 2638 to provide many functions for applications 2620 and other software modules.

The frameworks 2618 (also sometimes referred to as middleware) provide a higher-level common infrastructure that may be used by the applications 2620 and/or other software modules. For example, the frameworks 2618 may provide various graphic user interface (GUI) functions, high-level resource management, or high-level location services. The frameworks 2618 may provide a broad spectrum of other APIs for applications 2620 and/or other software modules.

The applications 2620 include built-in applications 2640 and/or third-party applications 2642. Examples of built-in applications 2640 may include, but are not limited to, a contacts application, a browser application, a location application, a media application, a messaging application, and/or a game application. Third-party applications 2642 may include any applications developed by an entity other than the vendor of the particular platform. The applications 2620 may use functions available via OS 2614, libraries 2616, frameworks 2618, and presentation layer 2644 to create user interfaces to interact with users.

Some software architectures use virtual machines, as illustrated by a virtual machine 2648. The virtual machine 2648 provides an execution environment where applications/modules can execute as if they were executing on a hardware machine (such as the machine 2700 of FIG. 27, for example). The virtual machine 2648 may be hosted by a host OS (for example, OS 2614) or hypervisor, and may have a virtual machine monitor 2646 which manages operation of the virtual machine 2648 and interoperation with the host operating system. A software architecture, which may be different from software architecture 2602 outside of the virtual machine, executes within the virtual machine 2648 such as an OS 2650, libraries 2652, frameworks 2654, applications 2656, and/or a presentation layer 2658.

Figure 27:
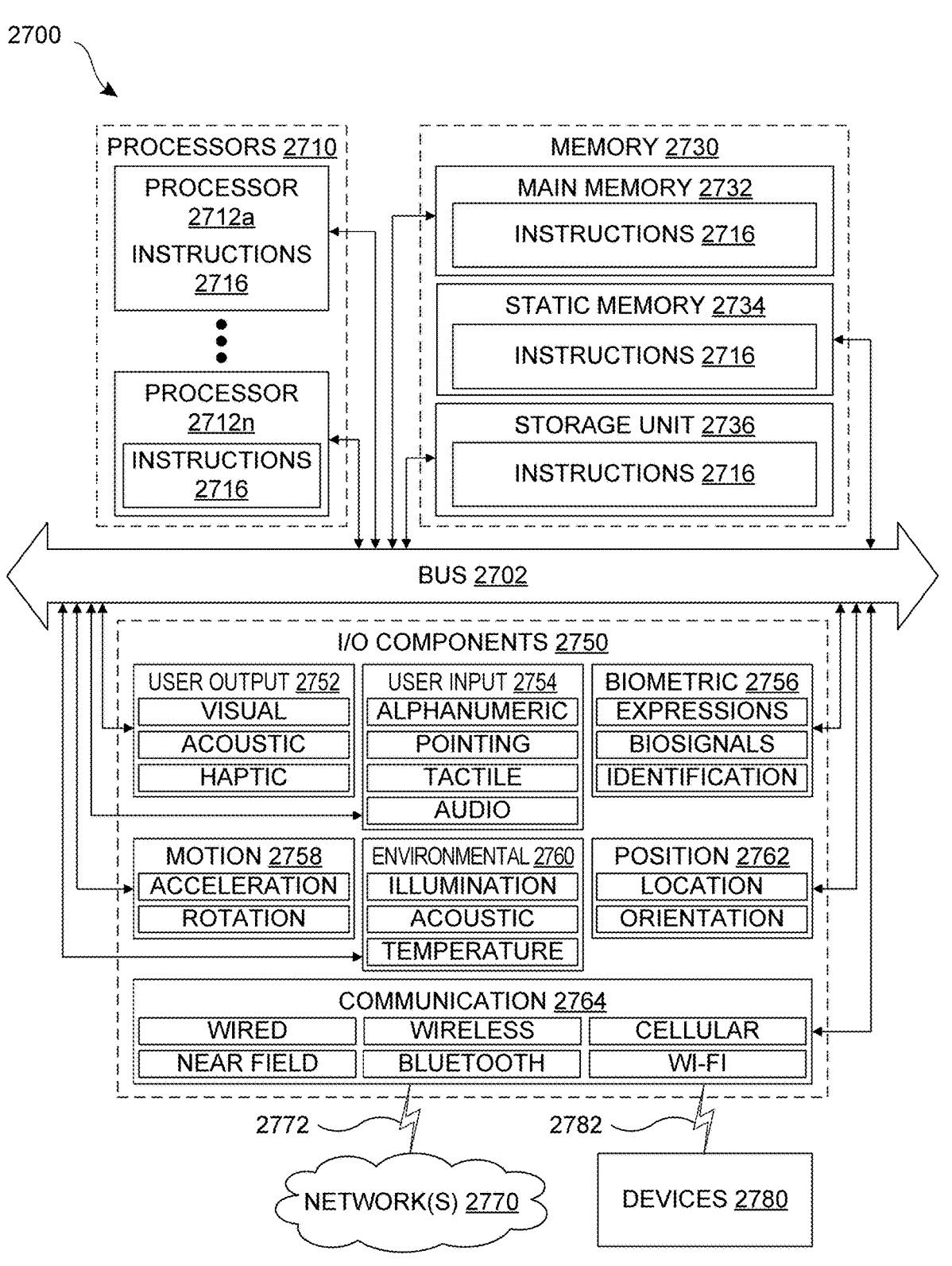
FIG. 27 is a block diagram showing components of an example machine configured to read instructions from a machine-readable medium and perform any of the features described herein.

FIG. 27 is a block diagram illustrating components of an example machine 2700 configured to read instructions from a machine-readable medium (for example, a machine-readable storage medium) and perform any of the features described herein. The example machine 2700 is in a form of a computer system, within which instructions 2716 (for example, in the form of software components) for causing the machine 2700 to perform any of the features described herein may be executed. As such, the instructions 2716 may be used to implement modules or components described herein. The instructions 2716 cause unprogrammed and/or unconfigured machine 2700 to operate as a particular machine configured to carry out the described features. The machine 2700 may be configured to operate as a standalone device or may be coupled (for example, networked) to other machines. In a networked deployment, the machine 2700 may operate in the capacity of a server machine or a client machine in a server-client network environment, or as a node in a peer-to-peer or distributed network environment. Machine 2700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2700 is illustrated, the term "machine" includes a collection of machines that individually or jointly execute the instructions 2716.

The machine 2700 may include processors 2710, memory 2730, and I/O components 2750, which may be communicatively coupled via, for example, a bus 2702. The bus 2702 may include multiple buses coupling various elements of machine 2700 via various bus technologies and protocols. In an example, the processors 2710 (including, for example, a central processing unit (CPU), a graphics processing unit (GPU), a digital signal processor (DSP), an ASIC, or a suitable combination thereof) may include one or more processors 2712a to 2712n that may execute the instructions 2716 and process data. In some examples, one or more processors 2710 may execute instructions provided or identified by one or more other processors 2710. The term "processor" includes a multi-core processor including cores that may execute instructions contemporaneously. Although FIG. 27 shows multiple processors, the machine 2700 may include a single processor with a single core, a single processor with multiple cores (for example, a multi-core processor), multiple processors each with a single core, multiple processors each with multiple cores, or any combination thereof. In some examples, the machine 2700 may include multiple processors distributed among multiple machines.

The memory/storage 2730 may include a main memory 2732, a static memory 2734, or other memory, and a storage unit 2736, both accessible to the processors 2710 such as via the bus 2702. The storage unit 2736 and memory 2732, 2734 store instructions 2716 embodying any one or more of the functions described herein. The memory/storage 2730 may also store temporary, intermediate, and/or long-term data for processors 2710. The instructions 2716 may also reside, completely or partially, within the memory 2732, 2734, within the storage unit 2736, within at least one of the processors 2710 (for example, within a command buffer or cache memory), within memory at least one of I/O components 2750, or any suitable combination thereof, during execution thereof. Accordingly, the memory 2732, 2734, the storage unit 2736, memory in processors 2710, and memory in I/O components 2750 are examples of machine-readable media.

As used herein, "machine-readable medium" refers to a device able to temporarily or permanently store instructions and data that cause machine 2700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2716) for execution by a machine 2700 such that the instructions, when executed by one or more processors 2710 of the machine 2700, cause the machine 2700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2750 may include a wide variety of hardware components adapted to receive input, provide output, produce output, transmit information, exchange information, capture measurements, and so on. The specific I/O components 2750 included in a particular machine will depend on the type and/or function of the machine. For example, mobile devices such as mobile phones may include a touch input device, whereas a headless server or IoT device may not include such a touch input device. The particular examples of I/O components illustrated in FIG. 27 are in no way limiting, and other types of components may be included in machine 2700. The grouping of I/O components 2750 are merely for simplifying this discussion, and the grouping is in no way limiting. In various examples, the I/O components 2750 may include user output components 2752 and user input components 2754. User output components 2752 may include, for example, display components for displaying information (for example, a liquid crystal display (LCD) or a projector), acoustic components (for example, speakers), haptic components (for example, a vibratory motor or force-feedback device), and/or other signal generators. User input components 2754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2750 may include biometric components 2756, motion components 2758, environmental components 2760, and/or position components 2762, among a wide array of other physical sensor components. The biometric components 2756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2758 may include, for example, acceleration sensors (for example, an accelerometer) and rotation sensors (for example, a gyroscope). The environmental components 2760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2762 may include, for example, location sensors (for example, a Global Position System (GPS) receiver), altitude sensors (for example, an air pressure sensor from which altitude may be derived), and/or orientation sensors (for example, magnetometers).

The I/O components 2750 may include communication components 2764, implementing a wide variety of technologies operable to couple the machine 2700 to network(s) 2770 and/or device(s) 2780 via respective communicative couplings 2772 and 2782. The communication components 2764 may include one or more network interface components or other suitable devices to interface with the network(s) 2770. The communication components 2764 may include, for example, components adapted to provide wired communication, wireless communication, cellular communication, Near Field Communication (NFC), Bluetooth communication, Wi-Fi, and/or communication via other modalities. The device(s) 2780 may include other machines or various peripheral devices (for example, coupled via USB).

In some examples, the communication components 2764 may detect identifiers or include components adapted to detect identifiers. For example, the communication components 2764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

In one aspect of the invention, a satellite communication system which includes a first satellite constellation with a plurality of satellites; a second satellite constellation with a satellite, and a route management function (RMF) that routes user data, wherein delay sensitive traffic is routed via a satellite which has lower latency, and delay insensitive traffic is routed via a satellite which has higher latency.

In another aspect of the invention, a satellite communication system which includes an LEO satellite constellation with a plurality of satellites; a MEO satellite constellation with a satellite, and a route management function (RMF) that routes user data, wherein delay sensitive traffic is routed via an LEO satellite which has lower latency, and delay insensitive traffic is routed via an MEO satellite which has higher latency.

What is claimed is:

1. A satellite communication system comprising:

a first satellite constellation with a plurality of satellites including a first satellite;

a second satellite constellation including a second satellite;

a user terminal;

a network management server that detects and anticipates an in-line event to provide interference mitigation when a lobe of the first satellite and a lobe of the user terminal communicating with the second satellite intersect sufficiently to cause interference more than a threshold amount on a common frequency band of a link of the first satellite;

when the interference is between a main lobe of the first satellite and a main lobe of the user terminal communicating with the second satellite, the interference mitigation includes resource consolidation that switches traffic to another band on the link; and when the interference comprises sidelobe degradation between a sidelobe of the first satellite and a side lobe of the user terminal, the interference mitigation includes adaptive beam nulling that suppresses beam response in a sidelobe in a direction of the in-line event;

wherein the network management server detects and anticipates the in-line event from a relative position of the first satellite, the second satellite and the user terminal using data from a gateway position database that contains gateway positions and a satellite ephemeris database that contains a satellite ephemeris of the first satellite and a satellite ephemeris of the second satellite.

2. The satellite communication system of claim 1, wherein the resource consolidation switches Ka band traffic to a V or Q band when resources on the V or Q band are available.

3. The satellite communication system of claim 1, wherein mitigation of the interference comprises resource diversion that switches traffic to an alternate link.

4. The satellite communication system of claim 3, wherein the resource diversion switches traffic to the alternate link by routing the traffic to a nearby gateway through an inter-satellite link.

5. The satellite communication system of claim 1, wherein the adaptive beam nulling comprises adjusting beamforming coefficients to create a null or suppressed sidelobes.

6. A method of communicating on a multi-satellite communication system comprising:

providing a first satellite constellation with a plurality of satellites including a first satellite;

providing a second satellite constellation with a second satellite;

obtaining data to determine an in-line event including a relative position of the first satellite, the second satellite and a user terminal from a gateway position database that contains gateway positions and from a satellite ephemeris database that contains a satellite ephemeris of the first satellite and a satellite ephemeris of the second satellite;

detecting and anticipating when an in-line event will occur to provide interference mitigation when a lobe of the first satellite and a lobe of a user terminal communicating with the second satellite intersect sufficiently to cause interference more than a threshold amount on a common frequency band of a link of the first satellite;

when the interference is between a main lobe of the first satellite and a main lobe of the user terminal communicating with the second satellite, the interference mitigation includes resource consolidation that switches traffic to another band on the link; and when the interference comprises sidelobe degradation between a sidelobe of the first satellite and a side lobe of the user terminal, the interference mitigation includes adaptive beam nulling that suppresses beam response in a sidelobe in a direction of the in-line event; and mitigating interference when the in-line event occurs.

7. The method of communicating on a multi-satellite communication system of claim 6, wherein the switching traffic comprises switching Ka band traffic to a V or Q band when resources on the V or Q band are available.

8. The method communicating on a multi-satellite communication system of claim 6, wherein mitigating interference comprises switching traffic to an alternate link.

9. The method communicating on a multi-satellite communication system of claim 8, wherein switching traffic to the alternate link comprises routing the traffic to a nearby gateway through an inter-satellite link.

10. The method communicating on a multi-satellite communication system of claim 6, wherein the adaptive beam nulling comprises adjusting beamforming coefficients to create a null or suppressed sidelobes.

11. A satellite communication system comprising:

a first satellite constellation with a plurality of satellites including a first satellite;

a second satellite constellation with a second satellite;

a network management server that detects and anticipates an in-line event to provide interference mitigation when a lobe of the first satellite and a lobe of a user terminal communicating with the second satellite intersect sufficiently to cause interference more than a threshold amount on a common frequency band of a link of the first satellite;

when the interference is between a main lobe of the first satellite and a main lobe of the user terminal communicating with the second satellite, the interference mitigation includes resource consolidation that switches Ka band traffic to a V or Q band when resources on the V or Q band are available and mitigation of the interference comprises resource diversion that switches traffic to an alternate link when resources on the V or Q band are not available;

when the interference comprises sidelobe degradation between a sidelobe of the first satellite and a side lobe of the user terminal, the interference mitigation comprises adaptive beam nulling that suppresses beam response in a sidelobe in a direction of the in-line event;

wherein:

the network management server mitigates interference when the in-line event occurs the network management server detects and anticipates the in-line event is from a relative position of the first satellite, the second satellite and a user terminal using data from a gateway position database that contains gateway positions and a satellite ephemeris database that contains a satellite ephemeris of the first satellite and a satellite ephemeris of the second satellite.

12. The satellite communication system of claim 11, wherein the resource diversion switches traffic to the alternate link by routing the traffic to a nearby gateway through an inter-satellite link.

13. The satellite communication system of claim 11, wherein the adaptive beam nulling comprises adjusting beamforming coefficients to create a null or suppressed sidelobes.

\* \* \* \* \*